(12) United States Patent
Moshe

(10) Patent No.: US 9,002,113 B2
(45) Date of Patent: Apr. 7, 2015

(54) PROCESSING AND ANALYZING HYPER-SPECTRAL IMAGE DATA AND INFORMATION VIA DYNAMIC DATABASE UPDATING

(75) Inventor: Danny S. Moshe, Tel-Aviv (IL)

(73) Assignee: Green Vision Systems Ltd., Tel-Aviv (IL)

( * ) Notice: Subject to any disclaimer, the term of this patent is extended or adjusted under 35 U.S.C. 154(b) by 884 days.

(21) Appl. No.: 12/280,999

(22) PCT Filed: Mar. 1, 2007

(86) PCT No.: PCT/IL2007/000268
§ 371 (c)(1),
(2), (4) Date: Nov. 3, 2008

(87) PCT Pub. No.: WO2007/099540
PCT Pub. Date: Sep. 7, 2007

(65) Prior Publication Data
US 2009/0210447 A1    Aug. 20, 2009

Related U.S. Application Data

(60) Provisional application No. 60/777,512, filed on Mar. 1, 2006.

(51) Int. Cl.
*G06F 17/30* (2006.01)
*G06K 9/20* (2006.01)

(52) U.S. Cl.
CPC ........... *G06K 9/2018* (2013.01); *Y10S 707/915* (2013.01)

(58) Field of Classification Search
USPC .................. 382/191, 103, 159; 707/696, 915
See application file for complete search history.

(56) References Cited

U.S. PATENT DOCUMENTS 6,008,492 A * 12/1999 Slater et al. .................... 250/334
6,422,508 B1 * 7/2002 Barnes .......................... 244/3.16
(Continued)

OTHER PUBLICATIONS

Office Action Dated Jan. 19, 2012 From the Israel Patent Office Re. Application No. 193806 and Its Translation Into English.
(Continued)

*Primary Examiner* — Kim Vu
*Assistant Examiner* — Michael Vanchy, Jr.

(57) ABSTRACT

Processing and analyzing hyper-spectral image data and information via dynamic database updating. (a) processing/analyzing representations of objects within a sub set of the hyper spectral image data and information, using a first reference database of hyper spectral image data, information, and parameters, and, a second reference database of biological, chemical, or/and physical data, information, and parameters. Identifying objects of non-interest, and objects of potential interest, from the data/information sub-set. (b) processing/analyzing identified objects of potential interest, by further using first and second reference databases. Determining absence or presence of objects of interest, additional objects of non-interest, and non-classifiable objects of potential interest, from the data/information sub set. (c) updating first and second reference databases, using results of (a) and (b), for forming updated first and second reference databases. (d) repeating (a) through (c) for next sub-set of hyper spectral image data/information, using updated first and second reference databases. (e) repeating (d) for next sub-sets of hyper spectral image data/information.

11 Claims, 3 Drawing Sheets

(56) References Cited

U.S. PATENT DOCUMENTS

| | | | | |
|---|---|---|---|---|
| 6,809,991 | B1* | 10/2004 | Pepper et al. | 367/149 |
| 7,219,086 | B2* | 5/2007 | Geshwind et al. | 706/20 |
| 2004/0003295 | A1* | 1/2004 | Elderfield et al. | 713/202 |
| 2004/0210391 | A1* | 10/2004 | Kolodner et al. | 702/3 |
| 2004/0213459 | A1* | 10/2004 | Ishimaru et al. | 382/191 |
| 2005/0254709 | A1 | 11/2005 | Geshwind et al. | |
| 2005/0286770 | A1* | 12/2005 | Hirata | 382/191 |

OTHER PUBLICATIONS

Intenational Search Report and the Written Opinion Dated Jul. 18, 2008 From the International Searching Authority Re.: Application No. PCT/IL07/00268.

International Preliminary Report on Patentability Dated Sep. 12, 2008 From the International Bureau of WIPO Re.: Application No. PCT/IL2007/000268.

International Search Report and the Written Opinion Dated 14 Mar. 2008 From the International Searching Authority Re.: Application No. PCT/IL2007/000268.

International Dearch Report Dated Jul. 18, 2008 From the International Searching Authority Re.: Application No. PCT/IL07/00268.

International Preliminary Report on Patentability Dated Sep. 12, 2008 From the International Bureau of WIPO Re.: Application No. PCT.IL2007/000268.

International Search Report Dated Mar. 14, 2008 From the International Searching Authority Re.: Application No. PCT/IL2007/000268.

Written Opinion Dated Mar. 14, 2008 From the International Searching Authority Re.: Application No. PCT/IL2007/000268.

Written Opinion Dated Jul. 18, 2008 From the International Searching Authority Re.: Application No. PCT/IL07/000268. Rizvi et al. "A Modular Clutter Rejection Technique for FLIR Imagery Using Region-Based Principal Component Analysis", Pattern Recognition, 35: 2895-2904, 2002. Abstract, P.1, 4.

Office Action Dated Dec. 9, 2012 From the Israel Patent Office Re. Application No. 193806 and Its Translation Into English.

Office Action Dated May 12, 2014 From the Israel Patent Office Re. Application No. 193806 and Its Translation Into English.

* cited by examiner

Step (a)

> Identifying objects of non-interest, and objects of potential interest, from a sub-set of the hyper-spectral image data and information, by processing and analyzing hyper-spectral images and emission spectra of objects within the data and information sub-set. Includes using a first reference object database of hyper-spectral data, information, and parameters, and, a second reference object database of biological, chemical, or/and physical data, information, and parameters.

Step (b)

> Determining: (1) absence or presence of objects of interest, (2) additional objects of non-interest, and (3) non-classifiable objects of potential interest, from the identified objects of potential interest, by processing and analyzing the identified objects of potential interest.

Step (c)

> Forming an updated first reference object database and an updated second reference object database, by using results of Steps (a) and (b).

Step (d)

> Repeating Steps (a) through (c) for next sub-set of the hyper-spectral image data and information, by using the updated first reference object database and the updated second reference object database.

Step (e)

> Repeating Step (d) for a number of the next sub-sets of the hyper-spectral image data and information.

Fig. 1

FOV : Field of View of a single hyper-spectral Image
Object Type: ONI - Objects of Non-Interest;  OPI - Objects of Potential Interest ONI : Objects of Non Interest; OPI: Objects of Potential Interest
AONI: Additional Objects of Non Interest; OI: Objects of Interest (targets)
NC – OPI: Non-Classifiable Objects of Potential Interest
C/D – Confirmation / Decision

PROCESSING AND ANALYZING HYPER-SPECTRAL IMAGE DATA AND INFORMATION VIA DYNAMIC DATABASE UPDATING

RELATED APPLICATIONS

This application is a National Phase of PCT Patent Application No. PCT/IL2007/000268 having International Filing Date of Mar. 1, 2007, which claims the benefit of priority of U.S. Provisional Patent Application No. 60/777,512 filed on Mar. 1, 2006. The contents of the above applications are all incorporated by reference as if fully set forth herein in their entirety.

FIELD AND BACKGROUND OF THE INVENTION

The present invention relates to hyper-spectral imaging, in general, generating and collecting hyper-spectral images, and, processing and analyzing hyper-spectral image data and information, in particular. More particularly, the present invention relates to a method of processing and analyzing hyper-spectral image data and information via dynamic database updating.

Hyper-spectral imaging and analysis has been established as a highly unique, specialized, and sophisticated, combined spectroscopy and imaging type of analytical method or technique, in the more encompassing field or area of analytical science and technology, involving the sciences and technologies of spectroscopy and imaging. By definition, hyper-spectral imaging and analysis is based on a combination of spectroscopy and imaging theories, principles, and practices, which are exploitable for analyzing objects, such as objects in a sample of matter, in a highly unique, specialized, and sophisticated, manner.

Hyper-spectral imaging, in general, generating and collecting hyper-spectral images, and, processing and analyzing hyper-spectral image data and information, in particular, theory, principles, and practices thereof, and, related and associated applications and subjects thereof, such as the more general subject of spectral imaging, are well known and taught about in the prior art and currently practiced in a wide variety of numerous different fields and areas of science and technology. Several (mostly recent) examples of such prior art teachings and practices are disclosed in references 1-19 (and references cited therein). Selected teachings and practices by the same applicant/assignee of the present invention are disclosed in references 20-25 (and references cited therein). For assisting in establishing the field, scope, and meaning of the present invention, and in understanding problems solved by the present invention, the following background is provided.

Hyper-Spectral Imaging and Analysis

The more highly specialized, complex, and sophisticated, spectroscopic imaging technique of 'hyper-spectral' imaging and analysis, in contrast to the regular or standard spectroscopic imaging technique of 'spectral' imaging and analysis, consists of using a hyper-spectral imaging and analysis system for on-line (real time, near-real time) or off-line generating and collecting (acquiring) hyper-spectral images and spectra (herein, together, generally referred to as hyper-spectral image data and information), and, processing and analyzing the acquired hyper-spectral image data and information. In hyper-spectral imaging, a sample of matter (containing objects, and components thereof) is exposed to electromagnetic radiation, followed by generation and collection of relatively large numbers of multiple spectral (i.e., hyper-spectral) images, 'one-at-a-time', but, in an extremely fast or rapid sequential manner, of the objects (and components thereof) emitting electromagnetic radiation at a plurality of many wavelengths and frequencies, where the wavelengths and frequencies are associated with different selected (relatively narrow) portions or bands, or bands therein, of an entire hyper-spectrum emitted by the objects (and components thereof). A hyper-spectral imaging and analysis system can be operated in an extremely fast or rapid manner for providing exceptionally highly resolved spectral and spatial data and information of an imaged sample of matter, with high accuracy and high precision (reproducibility), which are unattainable by using a regular or standard spectral imaging and analysis system.

Hyper-spectral images generated by, and collected from, a sample of matter, are correlated with emission spectra of the sample of matter, where the emission spectra correspond to spectral representations in the form of spectral 'fingerprint' or 'signature' pattern types of identification and characterization, of the hyper-spectrally imaged objects (and components thereof) in the sample of matter. Such hyper-spectral image data and information are processed and analyzed by using automatic pattern recognition (APR) or/and optical character recognition (OCR) types of hyper-spectral imaging data and information processing and analysis, for identifying, characterizing, or/and classifying, the physical, chemical, or/and biological, properties, characteristics, and behavior, of the hyper-spectrally imaged objects (and components thereof) in the sample of matter.

Object

Herein, in the context of the field and art of the present invention, the term 'object' generally refers to, and is considered synonymous with, at least part of an entity, material, substance, or structure, which, singly or in combination with other objects (entities, materials, substances, or structures), typically as part of a scene (defined hereinbelow), is subjected to a hyper-spectral imaging process or technique. In general, such an object is definable and characterizable by a set of a wide variety of numerous possible biological, chemical, or/and physical, properties, characteristics, and behavior.

Hyper-Spectral Imaging—Generating and Collecting the Hyper-Spectral Image Data and Information Herein, in the context of the field and art of the present invention, in hyper-spectral imaging, an object (as defined hereinabove) or objects, typically as part of a scene, is/are exposed to natural or/and man-made electromagnetic radiation, followed by generation and collection of multiple spectral (i.e., hyper-spectral) images, via a single field of view, or via a plurality of fields of view, of the object(s) emitting electromagnetic radiation having wavelengths and frequencies associated with different selected (relatively narrow) portions or bands, or bands therein, of an entire spectrum emitted by the object(s). Hyper-spectral images generated by, and collected from, a sample of matter, are correlated with emission spectra of the sample of matter, where the emission spectra correspond to spectral representations in the form of spectral 'fingerprint' or 'signature' pattern types of identification and characterization, of the hyper-spectrally imaged objects (and components thereof) in the sample of matter.

Imaged Scene of Objects in Hyper-Spectral Imaging

Typically, one performs hyper-spectral imaging of an object or of objects, as part of a scene, in order to ultimately obtain micro scale or/and macro scale (qualitative or/and quantitative) biological, chemical, or/and physical, characteristics, properties, and behavior, of the imaged object(s) which are readily interpretable, understandable, and further usable, by a human operator (observer, viewer, analyzer, or/and controller) of a process involving the imaged object(s) in the scene. Herein, a scene generally refers to surroundings or a place of (i.e., including or containing) a single object, or, a plurality, collection, or ensemble, of several objects (i.e., entities, materials, substances, or structures), wherein takes place or occurs an action or event involving one or more object(s). Accordingly, in the context of the field and art of the present invention, in hyper-spectral imaging, an imaged scene generally corresponds to one or more hyper-spectral images, associated with one or more fields of view, of surroundings or a place of (i.e., including or containing) a single object, or, a plurality, collection, or ensemble, of several objects (i.e., entities, materials, substances, or structures), wherein takes place or occurs an action or event involving one or more imaged object(s). Moreover, in hyper-spectral imaging, an imaged scene includes or contains hyper-spectral image data and information relating to the imaged object(s), particularly in the form of spectral representations, such as spectral fingerprint or signature pattern types of identification and characterization, of the imaged object(s).

Types, Categories, or Classes, of Objects in Hyper-Spectral Imaged Scenes

In general, a scene can be considered as including or containing any number of objects which can be typed, categorized, or classified, according to two main different types, categories, or classes, of objects. Namely, objects of non-interest, and objects of interest, each of which is basically defined as follows. Objects of non-interest correspond to objects of (included or contained in) a scene which are not of interest to a human operator (observer, viewer, analyzer, or/and controller) of a process involving the objects. Objects of interest correspond to objects of (included or contained in) a scene which are of interest to a human operator of a process involving the objects. For further understanding the significantly different meanings and attributes of objects of non-interest and objects of interest, in the context of the field and art of the present invention, objects of non-interest may be considered as being 'background' of, or within, a scene, whereas objects of interest may be considered as being 'targets' of, or within, a scene.

Accordingly, in hyper-spectral imaging, individual objects among a plurality, collection, or ensemble, of several objects (i.e., entities, materials, substances, or structures) of (included or contained in) the surroundings or place of a scene which is imaged in one or more hyper-spectral images, via one or more fields of view, can be typed, categorized, or classified, according to the above stated two main different types, categories, or classes, of objects, i.e., objects of non-interest (i.e., background), and objects of interest (i.e., targets).

Each main different general type, category, or class, of objects of (included or contained in) a scene is definable or characterizable by one or more sets of a priori or pre-determined known data, information, and parameters, (e.g., in the form of databases of theoretically or/and empirically determined data, information, and parameters) and rules for using thereof, which are obtained and established by a human operator of a process involving the objects of (included or contained in) the scene. For example, such sets of a priori or pre-determined known data, information, and parameters, are typically based on databases of theoretically or/and empirically determined 'hyper-spectral' data, information, and parameters, and, on databases of theoretically or/and empirically determined 'biological, chemical, or/and physical' data, information, and parameters, which are associatable and correlatable with the objects of the scene, and which are applicable for uniquely identifying (recognizing), discriminating, comparing, filtering, sorting, quantifying, characterizing, and classifying, the objects of the scene.

Processing and Analyzing Hyper-Spectral Image Data and Information

Typically, specific (relatively narrow) portions or bands, or bands therein, of wavelengths and wavelength ranges of the electromagnetic radiation emitted by the object(s) are empirically determined, and then exploited during hyper-spectral imaging, for generating and collecting hyper-spectral images which contain a plethora of hyper-spectral image data and information relating to the imaged object(s), particularly in the form of spectral representations, such as spectral fingerprint or signature pattern types of identification and characterization, of the imaged object(s), that need to be processed and analyzed.

In general, one may consider processing, and analyzing, of hyper-spectral image data and information as two separate, but integrated, main activities, as follows. One may consider processing of hyper-spectral image data and information as being based on, and involving, real time (i.e., in-line or on-line) or/and non-real time (i.e., off-line) automatic (i.e., computerized) data and information manipulating, handling, or/and moving, types of procedures or/and operations. One may consider analyzing of hyper-spectral image data and information as being based on, and involving, real time (i.e., in-line or on-line) or/and non-real time (i.e., off-line) automatic (i.e., computerized) data and information analyzing, identifying (recognizing), discriminating, comparing, filtering, sorting, quantifying, characterizing, and classifying, types of procedures or/and operations. Together, in an integrated manner, real time or/and non-real time processing and analyzing of the hyper-spectral image data and information are performed for the main goal of relating and translating the hyper-spectral image data and information of the imaged object(s) to micro scale or/and macro scale (qualitative or/and quantitative) biological, chemical, or/and physical, characteristics, properties, and behavior, of the imaged object(s) which are readily interpretable, understandable, and further usable, by a human (observer, viewer, analyzer, or/and controller, herein, generally referred to as operator) of a process involving the imaged object(s).

Accuracy, Precision (Reproducibility), Sensitivity, and Speed (Time Scale), of Hyper-Spectral Imaging Based on the preceding discussion, a scene which is imaged in one or more hyper-spectral images, via one or more fields of view, includes or contains a plurality, collection, or ensemble, of several objects (i.e., entities, materials, substances, or structures), wherein, there exists a number of objects which are objects of non-interest (background), and objects of interest (targets). The plethora of hyper-spectral image data and information represented by, and contained in, hyper-spectral images, via one or more fields of view, of a scene of (including or containing) objects must be processed and analyzed, in particular, by using various combinations of known sets or databases of (theoretically or/and empirically determined) 'hyper-spectral' and 'biological, chemical, or/and physical' data, information, and parameters, and rules for using thereof, for uniquely identifying (recognizing), discriminating, quantifying, characterizing, and classifying, each object of the imaged scene as being an object of non-interest (background), or as being an object of interest (a target). Only as a result of the integrated processing and analyzing of the hyper-spectral image data and information of the imaged scene of objects, can the hyper-spectral image data and information of the objects be related and translated to micro scale or/and macro scale (qualitative or/and quantitative) biological, chemical, or/and physical, characteristics, properties, and behavior, of the objects which are readily interpretable, understandable, and further usable, by a human operator of a process involving the objects of the imaged scene.

Many, if not most, hyper-spectral imaging and analysis applications involve automatically generating and collecting a relatively large number (e.g., on the order of hundreds, thousands, or millions) of individual hyper-spectral images (each containing a plurality of emission spectra, spectral fingerprints, and spectral patterns), typically, via a plurality of different fields of view, of a plurality of scenes, wherein each scene includes or contains a single object, or a plurality, collection, or ensemble, of several objects (i.e., entities, materials, substances, or structures). Accordingly, such hyper-spectral imaging and analysis applications necessarily involve processing and analyzing 'huge' amounts of 'raw' hyper-spectral image data and information.

Performance of a given hyper-spectral imaging and analysis application is based on, and influenced by, accuracy, precision (i.e., reproducibility), and sensitivity, of several parameters, and particularly of the main parameter of (spectral and spatial) resolution. Spectral resolution relates to the resolution of the optically detected electromagnetic radiation of the affected energy or emission beam emitted by, and emerging from, illuminated objects of (included or contained in) a scene, from which are generated optical forms, and electronic forms, of hyper-spectral images of the illuminated objects. Spatial resolution relates to the resolution of the topological, morphological or geometrical spaces or/and dimensions within or/and between the chemical, biological, or/and physical, components or elements which comprise a given object (entity, material, substance, or structure) of (included or contained in) an imaged scene. Speed (time scale) relates to the speed (time scale) at which part of a process, or an entire process, of the hyper-spectral imaging and analysis application is performed.

Ordinarily, a human operator of a given hyper-spectral imaging and analysis application inherently desires highly accurate, highly precise (i.e., reproducible), and highly sensitive, generation and collection of hyper-spectral images, as well as highly accurate, highly precise, and highly sensitive, processing and analyzing of the generated and collected 'raw' hyper-spectral image data and information. In addition to, and related to, high accuracy, high precision, and high sensitivity, of generating and collecting hyper-spectral images, and of processing and analyzing the 'raw' hyper-spectral image data and information therefrom, there is the speed (or time scale) at which these activities and procedures are performed. Ideally, a human operator of a given hyper-spectral imaging and analysis application inherently desires that generating and collecting hyper-spectral images, and processing and analyzing the 'raw' hyper-spectral image data and information therefrom, be performed as highly accurately, as highly precise (reproducible), and as highly sensitive, as technically possible or feasible, at as high a speed (or short time scale) as technically possible or feasible. Clearly, actual levels of accuracy, precision, sensitivity, and speed (time scale), of a given hyper-spectral imaging and analysis application are measured, evaluated, compared, and analyzed, relative to known or established criteria and levels of accuracy, precision, sensitivity, and speed (time scale).

As with most activities or/and phenomena, in hyper-spectral imaging and analysis applications, accuracy, precision, sensitivity, and speed (time scale), are often, and usually, not directly related and proportional to each other. In other words, it is often, and usually, difficult to have a hyper-spectral imaging and analysis application which can be characterized at the same time as being highly accurate, highly precise (reproducible), highly sensitive, and of high speed (short time scale). Often, and usually, high accuracy is achieved at the expense of achieving high precision or/and at the expense of achieving high sensitivity or/and at the expense of achieving high speed (short time scale). Similarly, high speed (short time scale) is often, and usually, achieved at the expense of achieving high accuracy or/and at the expense of achieving high precision or/and at the expense of achieving high sensitivity. In practice, any given hyper-spectral imaging and analysis application is characterized by some combination of variable levels of accuracy, precision, sensitivity, and speed (time scale).

One may consider a given hyper-spectral imaging and analysis application as being comprised of two separate, but integrated, domains or stages of main activities or procedures, as follows. The first domain or stage of main activities or procedures is based on, and involves, generating and collecting of the hyper-spectral images. The second domain or stage of main activities or procedures is based on, and involves, processing and analyzing the generated and collected hyper-spectral image data and information. In general, each of these two domains or stages of a hyper-spectral imaging and analysis application can be characterized by various different levels of accuracy, precision (reproducibility), sensitivity, and speed.

Accuracy, precision (reproducibility), sensitivity, and speed (time scale), of the first domain or stage of a hyper-spectral imaging and analysis application are primarily (i.e., not exclusively) determinable and controllable by the types, kinds, quantity, and quality, of 'physical' hardware equipment and instrumentation which comprise a given hyper-spectral imaging system, device, or apparatus. Accuracy, precision (reproducibility), sensitivity, and speed (time scale), of the second domain or stage of a hyper-spectral imaging and analysis application are primarily (i.e., not exclusively) determinable and controllable by the types, kinds, quantity, and quality, of (computer) 'software' which is used for implementing and operating a given hyper-spectral imaging system, device, or apparatus. Such software includes operatively connected and functioning written or printed data, in the form of software programs, software routines, software sub-routines, software symbolic languages, software code, software instructions or protocols, software algorithms, or/and combinations thereof. Clearly, in essentially all hyper-spectral imaging and analysis applications the just described two domains or stages of main activities or procedures are fully integrated, therefore, in theory, and in practice, accuracy, precision (reproducibility), sensitivity, or/and speed (time scale), of the first domain or stage affects, and is affected by, accuracy, precision (reproducibility), sensitivity, or/and speed (time scale), of the second domain or stage, and vice versa.

The scope of application of the present invention is directed to, and focused on, the preceding stated second domain or stage of main activities or procedures of a hyper-spectral imaging and analysis application, i.e., being based on, and involving, processing and analyzing generated and collected hyper-spectral image data and information. More specifically, wherein the processing and analyzing of hyper-spectral image data and information are based on, and involve, an integrated combination of: (i) real time or/and non-real time automatic (i.e., computerized) data and information manipulating, handling, or/and moving, types of procedures or/and operations, and (ii) real time or/and non-real time automatic (i.e., computerized) data and information analyzing, identifying (recognizing), discriminating, comparing, filtering, sorting, quantifying, characterizing, and classifying, types of procedures or/and operations.

Significant On-Going Problems and Limitations of Processing and Analyzing Hyper-Spectral Image Data and Information As stated hereinabove, prior art includes a plethora of teachings [e.g., 1-25] of hyper-spectral imaging, in general, generating and collecting hyper-spectral images, and, processing and analyzing hyper-spectral image data and information, in particular. However, significant on-going problems and limitations of processing and analyzing hyper-spectral image data and information are usually based on, involve, or/and are associated with, the theoretical or/and practical difficulties and complexities that arise when performing, or attempting to perform, the varied and numerous data and information processing and analyzing procedures or/and operations with some combination of exceptionally high accuracy, 'or/and' high precision (reproducibility), 'or/and' high sensitivity, 'or/and' at high speed (short time scale), be it during real time or during non-real time, in an optimum or highly efficient manner. Exceptional difficulties and complexities arise when performing, or attempting to perform, the varied and numerous data and information processing and analyzing procedures or/and operations with the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner.

There exists a wide variety of numerous different exemplary specific cases of hyper-spectral imaging and analysis applications wherein theoretical or/and practical difficulties and complexities arise when performing, or attempting to perform, the varied and numerous data and information processing and analyzing procedures or/and operations with some combination of exceptionally high accuracy, or/and high precision (reproducibility), or/and high sensitivity, or/and at high speed (short time scale), or, all at the same time (i.e., simultaneously), be it during real time or during non-real time, in an optimum or highly efficient manner. For background purposes, only a few such exemplary specific cases of hyper-spectral imaging and analysis applications are described herein, as follows.

As described hereinabove, a scene which is imaged in one or more hyper-spectral images, via one or more fields of view, includes or contains a plurality, collection, or ensemble, of several objects (i.e., entities, materials, substances, or structures), wherein, there exists a number of objects which are objects of non-interest (background), or/and objects of interest (targets). Typically, each hyper-spectrally imaged scene of a sample of matter includes or contains a distribution of different relative numbers (i.e., ratios, proportions) of the preceding defined two main different types, categories, or classes, of objects. For example, a given hyper-spectrally imaged scene may include or contain a distribution of a relatively small number of objects of interest (targets), and a relatively large number of objects of non-interest (corresponding to a relatively high or 'noisy' background). Conversely, a given imaged scene may include or contain a distribution of a relatively large number of objects of interest (targets), and a relatively small number of objects of non-interest (corresponding to a relatively low or 'quiet' background).

Moreover, for example, there are many hyper-spectral imaging and analysis applications wherein the majority of hyper-spectrally imaged scenes include or contain a relatively 'exceptionally' small number of objects of interest (targets) compared to a relatively large number of objects of non-interest (high or noisy background). For example, such applications are wherein the number of objects of interest (targets), relative to the number of all objects [of interest (target) and of non-interest (background)] of (included or contained in) a hyper-spectrally imaged scene, corresponds to a ratio or proportion as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-10}$% [1 part per trillion (pptr)].

In addition to hyper-spectrally imaged scenes including or containing distributions of different relative numbers (ratios, proportions) of the two main different types, categories, or classes, of objects, it is noted that each hyper-spectrally imaged object (i.e., entity, material, substance) is definable and characterizable by a set of a wide variety of numerous possible biological, chemical, or/and physical, properties, characteristics, and behavior. For example, in a given hyper-spectrally imaged scene, there may exist different relative numbers, and types kinds, of objects whose 'hyper-spectral' image data and information (particularly including, for example, emission spectra corresponding to spectral representations in the form of spectral fingerprint or signature pattern types of identification and characterization), are quite similar, or even nearly identical, i.e., barely distinguishable or resolvable, but whose 'biological, chemical, or/and physical' data and information (in terms of properties, characteristics, or/and behavior), are significantly different, and not at all similar or nearly identical, i.e., easily distinguishable or resolvable, or vice versa.

Regardless of the actual distributions of the different relative numbers (i.e., ratios, proportions) of objects of interest (targets) and objects of non-interest (background) in hyper-spectrally imaged scenes of a sample of matter, any hyper-spectral imaging and analysis application ultimately involves the need for identifying, distinguishing, and resolving, the objects of interest (targets) from the objects of non-interest (background) in the hyper-spectrally imaged scenes. This involves the need for identifying, distinguishing, and resolving, the hyper-spectral image data and information of the objects of interest (targets) from the hyper-spectral image data and information of the objects of non-interest (background). Moreover, there is also the need for performing such identifying, distinguishing, and resolving, procedures and operations in relation to the biological, chemical, or/and physical data and information of the objects of interest (targets) and of the objects of non-interest (background), in the hyper-spectrally imaged scenes.

In hyper-spectral imaging, processing and analyzing hyper-spectral image data and information is performed according to various different speeds or time scales. For example, there are many hyper-spectral imaging and analysis applications which, by definition, and in accordance with the particular characteristics, needs, or requirements, of such applications, necessarily require that processing and analyzing hyper-spectral image data and information be performed at exceptionally high speeds, for example, on the order of thousands or millions of data or/and information items per second, or, equivalently, at exceptionally short time scales, for example, on the order of milliseconds (msec) or microseconds (μsec) per data or/and information operation. This is particularly the case for hyper-spectral imaging and analysis applications which involve automatically generating and collecting relatively large numbers (e.g., on the order of tens or hundreds of thousands, or even millions) of individual hyper-spectral images (each containing a plurality of emission spectra, spectral fingerprints, and spectral patterns), typically, via a relatively large number of different fields of view, of a relatively large number of scenes, wherein each scene includes or contains a single object, or a plurality, collection, or ensemble, of several objects (i.e., entities, materials, substances, or structures).

For each of the preceding briefly described exemplary specific cases of hyper-spectral imaging and analysis applications, various theoretical or/and practical difficulties and complexities typically arise when performing, or attempting to perform, the varied and numerous data and information processing and analyzing procedures or/and operations with some combination of exceptionally high accuracy, or/and high precision (reproducibility), or/and high sensitivity, or/and at high speed (short time scale), be it during real time (i.e., in-line or on-line) or during non-real time (i.e., off-line), in an optimum or highly efficient manner. Thus, although prior art includes a plethora of teachings of hyper-spectral imaging, in general, generating and collecting hyper-spectral images, and, processing and analyzing hyper-spectral image data and information, in particular, there clearly exists an on-going need for overcoming the various and numerous significant on-going problems and limitations of processing and analyzing hyper-spectral image data and information.

There is thus a need for, and it would be highly advantageous to have a method of processing and analyzing hyper-spectral image data and information via dynamic database updating.

There is a need for such a method which, during real time (i.e., in-line or on-line) or/and during non-real time (i.e., off-line), optimally and highly efficiently, integrates the two main activities of processing, and analyzing, hyper-spectral image data and information, namely, (i) automatic (i.e., computerized) data and information manipulating, handling, or/and moving, types of procedures or/and operations, and, (ii) automatic (i.e., computerized) data and information analyzing, identifying (recognizing), discriminating, comparing, filtering, sorting, quantifying, characterizing, and classifying, types of procedures or/and operations. Moreover, there is a need for such a method which integrates the varied and numerous hyper-spectral image data and information processing and analyzing procedures or/and operations with the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner.

Additionally, there is a need for such a method which is implementable for achieving the main goal of relating and translating the hyper-spectral image data and information of imaged objects to micro scale or/and macro scale (qualitative or/and quantitative) biological, chemical, or/and physical, characteristics, properties, and behavior, of the imaged objects which are readily interpretable, understandable, and further usable, by a human operator (observer, viewer, analyzer, or/and controller) of a process involving the imaged objects.

There is a further need for such a method which is generally applicable to essentially any type, kind, or number, of objects (entities, materials, substances, or structures), as part of a scene, which are subjected to a hyper-spectral imaging process or technique. Moreover, wherein the objects are definable and characterizable by a set of a wide variety of numerous possible biological, chemical, or/and physical, properties, characteristics, and behavior.

There is a further need for such a method which is generally applicable to processing and analyzing hyper-spectral image data and information of hyper-spectral images of objects which are generated and collected from the objects emitting electromagnetic radiation having wavelengths and frequencies associated with different portions or bands, or bands therein, of an entire spectrum emitted by the objects, such as the ultra-violet (UV) band, the visible (VIS) band, the infra-red (IR) band, and the deep infra-red band.

There is a further need for such a method which is generally applicable to processing and analyzing hyper-spectral image data and information of hyper-spectral imaging and analysis applications involving automatically generating and collecting relatively large numbers (e.g., on the order of hundreds, thousands, or millions) of individual hyper-spectral images (each containing a plurality of emission spectra, spectral fingerprints, and spectral patterns), typically, via a plurality of different fields of view, of a plurality of scenes, wherein each scene includes or contains a single object, or a plurality, collection, or ensemble, of several objects (i.e., entities, materials, substances, or structures).

There is a further need for such a method which is generally applicable to processing and analyzing hyper-spectral image data and information of hyper-spectral imaging and analysis applications wherein the majority of imaged scenes include or contain an exceptionally relatively small number of objects of interest (targets) compared to a relatively large number of objects of non-interest (high or noisy background). For example, such cases wherein the fraction or concentration of the objects of interest (targets), relative to all objects [of non-interest (background) and of interest (targets)] of (included or contained in) an imaged scene, corresponds to as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-10}$% [1 part per trillion (pptr)].

There is a further need for such a method which is generally applicable to processing and analyzing hyper-spectral image data and information of hyper-spectral imaging and analysis applications which require distinguishing or resolving quite similar, or even nearly identical, hyper-spectral image data, information, and parameters, in relation to significantly different biological, chemical, or/and physical data, information, and parameters, of objects in imaged scenes.

There is a further need for such a method which is generally applicable to processing and analyzing hyper-spectral image data and information of hyper-spectral imaging and analysis applications according to various different speeds or time scales. For example, wherein such hyper-spectral imaging and analysis applications which, by definition, and in accordance with the particular characteristics, needs, or requirements, necessarily require that processing and analyzing hyper-spectral image data and information be performed at exceptionally high speeds, for example, on the order of thousands or millions of data or/and information items per second, or, equivalently, at exceptionally short time scales, for example, on the order of milliseconds (msec) or microseconds (μsec) per data or/and information operation.

There is a further need for such a method which is generally applicable to processing and analyzing hyper-spectral image data and information of hyper-spectral images of objects which are generated and collected by using various different types or kinds of hyper-spectral imaging systems, devices, or/and apparatuses, which are operable during real time (i.e., in-line or on-line) or/and during non-real time (i.e., off-line). Accordingly, there is a further need for such a method which is generally applicable to, and integratable with, various different types or kinds of physical hardware equipment and instrumentation, and, (computer) software, which comprise a given hyper-spectral imaging system, device, or apparatus, which is operable during real time (i.e., in-line or on-line) or/and during non-real time (i.e., off-line).

There is a further need for such a method which is commercially applicable in a wide variety of different fields and areas of technology, and associated applications thereof, which either are, or may be, based on, involve, or benefit from the use of, hyper-spectral imaging, in general, generating and collecting hyper-spectral images, and, processing and analyzing hyper-spectral image data and information, in particular.

SUMMARY OF THE INVENTION

The present invention relates to hyper-spectral imaging, in general, generating and collecting hyper-spectral images, and, processing and analyzing hyper-spectral image data and information, in particular. More particularly, the present invention relates to a method of processing and analyzing hyper-spectral image data and information via dynamic database updating.

The scope of application of the present invention is directed to, and focused on, the domain or stage of main activities or procedures of a hyper-spectral imaging and analysis application, i.e., being based on, and involving, processing and analyzing generated and collected hyper-spectral image data and information. More specifically, wherein the processing and analyzing of hyper-spectral image data and information are based on, and involve, an integrated combination of: (i) real time or/and non-real time automatic (i.e., computerized) data and information manipulating, handling, or/and moving, types of procedures or/and operations, and (ii) real time or/and non-real time automatic (i.e., computerized) data and information analyzing, identifying (recognizing), discriminating, comparing, filtering, sorting, quantifying, characterizing, and classifying, types of procedures or/and operations.

The method of processing and analyzing hyper-spectral image data and information via dynamic database updating, of the present invention, is based on uniquely using, and dynamically updating, a first reference object database of hyper-spectral image data, information, and parameters, and, a second reference object database of biological, chemical, or/and physical data, information, and parameters, during real time or/and during non-real time processing and analyzing of the hyper-spectral image data and information.

The method of the present invention, is also based on uniquely using sub-sets of the hyper-spectral image data and information for associating and correlating spectral representations, such as spectral fingerprint or signature pattern types of identification and characterization, of the imaged objects, with elements in the first reference object database of hyper-spectral image data, information, and parameters, and, with elements in the second reference object database of biological, chemical, or/and physical data, information, and parameters.

The method of the present invention is implementable or operable, during real time (i.e., in-line or on-line) or/and during non-real time (i.e., off-line), for optimally and highly efficiently, integrating the two main activities of processing, and analyzing, hyper-spectral image data and information, namely, (i) automatic (i.e., computerized) data and information manipulating, handling, or/and moving, types of procedures or/and operations, and, (ii) automatic (i.e., computerized) data and information analyzing, identifying (recognizing), discriminating, comparing, filtering, sorting, quantifying, characterizing, and classifying, types of procedures or/and operations. Moreover, the method of the present invention is implementable or operable for integrating the varied and numerous hyper-spectral image data and information processing and analyzing procedures or/and operations with the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner.

Additionally, the method of the present invention is implementable or operable for achieving the main goal of relating and translating the hyper-spectral image data and information of imaged objects to micro scale or/and macro scale (qualitative or/and quantitative) biological, chemical, or/and physical, characteristics, properties, and behavior, of the imaged objects which are readily interpretable, understandable, and further usable, by a human operator (observer, viewer, analyzer, or/and controller) of a process involving the imaged objects.

Additionally, the method of the present invention is implementable or operable for being generally applicable to essentially any type, kind, or number, of objects (entities, materials, substances, or structures), as part of a scene, which are subjected to a hyper-spectral imaging process or technique. Moreover, wherein the objects are definable and characterizable by a set of a wide variety of numerous possible biological, chemical, or/and physical, properties, characteristics, and behavior.

Additionally, the method of the present invention is implementable or operable for being generally applicable to processing and analyzing hyper-spectral image data and information of hyper-spectral images of objects which are generated and collected from the objects emitting electromagnetic radiation having wavelengths and frequencies associated with different portions or bands, or bands therein, of an entire spectrum emitted by the objects, such as the ultra-violet (UV) band, the visible (VIS) band, the infra-red (IR) band, and the deep infra-red band.

Additionally, the method of the present invention is implementable or operable for being generally applicable to processing and analyzing hyper-spectral image data and information of hyper-spectral imaging and analysis applications involving automatically generating and collecting relatively large numbers (e.g., on the order of hundreds, thousands, or millions) of individual hyper-spectral images (each containing a plurality of emission spectra, spectral fingerprints, and spectral patterns), typically, via a plurality of different fields of view, of a plurality of scenes, wherein each scene includes or contains a single object, or a plurality, collection, or ensemble, of several objects (i.e., entities, materials, substances, or structures).

Additionally, the method of the present invention is implementable or operable for being generally applicable to processing and analyzing hyper-spectral image data and information of hyper-spectral imaging and analysis applications wherein the majority of imaged scenes include or contain an exceptionally relatively small number of objects of interest (targets) compared to a relatively large number of objects of non-interest (high or noisy background). For example, such cases wherein the fraction or concentration of the objects of interest (targets), relative to all objects [of non-interest (background) and of interest (targets)] of (included or contained in) an imaged scene, corresponds to as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-10}$% [1 part per trillion (pptr)].

Additionally, the method of the present invention is implementable or operable for being generally applicable to processing and analyzing hyper-spectral image data and information of hyper-spectral imaging and analysis applications which require distinguishing or resolving quite similar, or even nearly identical, hyper-spectral image data, information, and parameters, in relation to significantly different biological, chemical, or/and physical data, information, and parameters, of objects in imaged scenes.

Additionally, the method of the present invention is implementable or operable for being generally applicable to processing and analyzing hyper-spectral image data and information of hyper-spectral imaging and analysis applications according to various different speeds or time scales. For example, wherein such hyper-spectral imaging and analysis applications which, by definition, and in accordance with the particular characteristics, needs, or requirements, necessarily require that processing and analyzing hyper-spectral image data and information be performed at exceptionally high speeds, for example, on the order of thousands or millions of data or/and information items per second, or, equivalently, at exceptionally short time scales, for example, on the order of milliseconds (msec) or microseconds (μsec) per data or/and information operation.

Additionally, the method of the present invention is implementable or operable for being generally applicable to processing and analyzing hyper-spectral image data and information of hyper-spectral images of objects which are generated and collected by using various different types or kinds of hyper-spectral imaging systems, devices, or/and apparatuses, which are operable during real time (i.e., in-line or on-line) or/and during non-real time (i.e., off-line). Accordingly, the method of the present invention is implementable or operable for being generally applicable to, and integratable with, various different types or kinds of physical hardware equipment and instrumentation, and, (computer) software, which comprise a given hyper-spectral imaging system, device, or apparatus, which is operable during real time (i.e., in-line or on-line) or/and during non-real time (i.e., off-line).

Additionally, the method of the present invention is readily commercially applicable to a wide variety of different fields and areas of technology, and associated applications thereof, which either are, or may be, based on, involve, or benefit from the use of, hyper-spectral imaging, in general, generating and collecting hyper-spectral images, and, processing and analyzing hyper-spectral image data and information, in particular.

The present invention successfully addresses and overcomes various significant problems and limitations, and widens the scope, of presently known techniques and methods of processing and analyzing hyper-spectral image data and information.

Thus, according to the present invention, there is provided a method of processing and analyzing hyper-spectral image data and information via dynamic database updating, the method comprising the following main steps or procedures: (a) identifying objects of non-interest, and objects of potential interest, from a sub-set of the hyper-spectral image data and information, by processing and analyzing hyper-spectral images and emission spectra of objects within the data and information sub-set, wherein step (a) includes using a first reference object database of hyper-spectral image data, information, and parameters, and, a second reference object database of biological, chemical, or/and physical data, information, and parameters; (b) determining: (1) absence or presence of objects of interest, (2) additional objects of non-interest, and (3) non-classifiable objects of potential interest, from the identified objects of potential interest, by processing and analyzing the identified objects of potential interest; (c) forming an updated first reference object database and an updated second reference object database, by using results of steps (a) and (b); (d) repeating steps (a) through (c) for next sub-set of the hyper-spectral image data and information, by using the updated first reference object database and the updated second reference object database; and (e) repeating step (d) for a number of the next sub-sets of the hyper-spectral image data and information.

The present invention is implemented by performing steps or procedures, and sub-steps or sub-procedures, in a manner selected from the group consisting of manually, semi-automatically, fully automatically, and a combination thereof, involving use and operation of system units, system sub-units, devices, assemblies, sub-assemblies, mechanisms, structures, components, and elements, and, peripheral equipment, utilities, accessories, and materials, in a manner selected from the group consisting of manually, semi-automatically, fully automatically, and a combination thereof. Moreover, according to actual steps or procedures, sub-steps or sub-procedures, system units, system sub-units, devices, assemblies, sub-assemblies, mechanisms, structures, components, and elements, and, peripheral equipment, utilities, accessories, and materials, used for implementing a particular embodiment of the disclosed invention, the steps or procedures, and sub-steps or sub-procedures, are performed by using hardware, software, or/and an integrated combination thereof, and the system units, sub-units, devices, assemblies, sub-assemblies, mechanisms, structures, components, and elements, and, peripheral equipment, utilities, accessories, and materials, operate by using hardware, software, or/and an integrated combination thereof.

In particular, software used for implementing the present invention includes operatively connected and functioning written or printed data, in the form of software programs, software routines, software sub-routines, software symbolic languages, software code, software instructions or protocols, software algorithms, or/and a combination thereof. In particular, hardware used for implementing the present invention includes operatively connected and functioning electrical, electronic or/and electromechanical system units, sub-units, devices, assemblies, sub-assemblies, mechanisms, structures, components, and elements, and, peripheral equipment, utilities, accessories, and materials, which may include one or more computer chips, integrated circuits, electronic circuits, electronic sub-circuits, hard-wired electrical circuits, or/and combinations thereof, involving digital or/and analog operations. Accordingly, the present invention is implemented by using an integrated combination of the just described software and hardware.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. In the drawings:

FIG. 1 is a (block type) flow diagram of the main steps (procedures) of a preferred embodiment of the method of processing and analyzing hyper-spectral image data and information via dynamic database updating, in accordance with the present invention.

DESCRIPTION OF THE PREFERRED EMBODIMENTS

Figure 2:
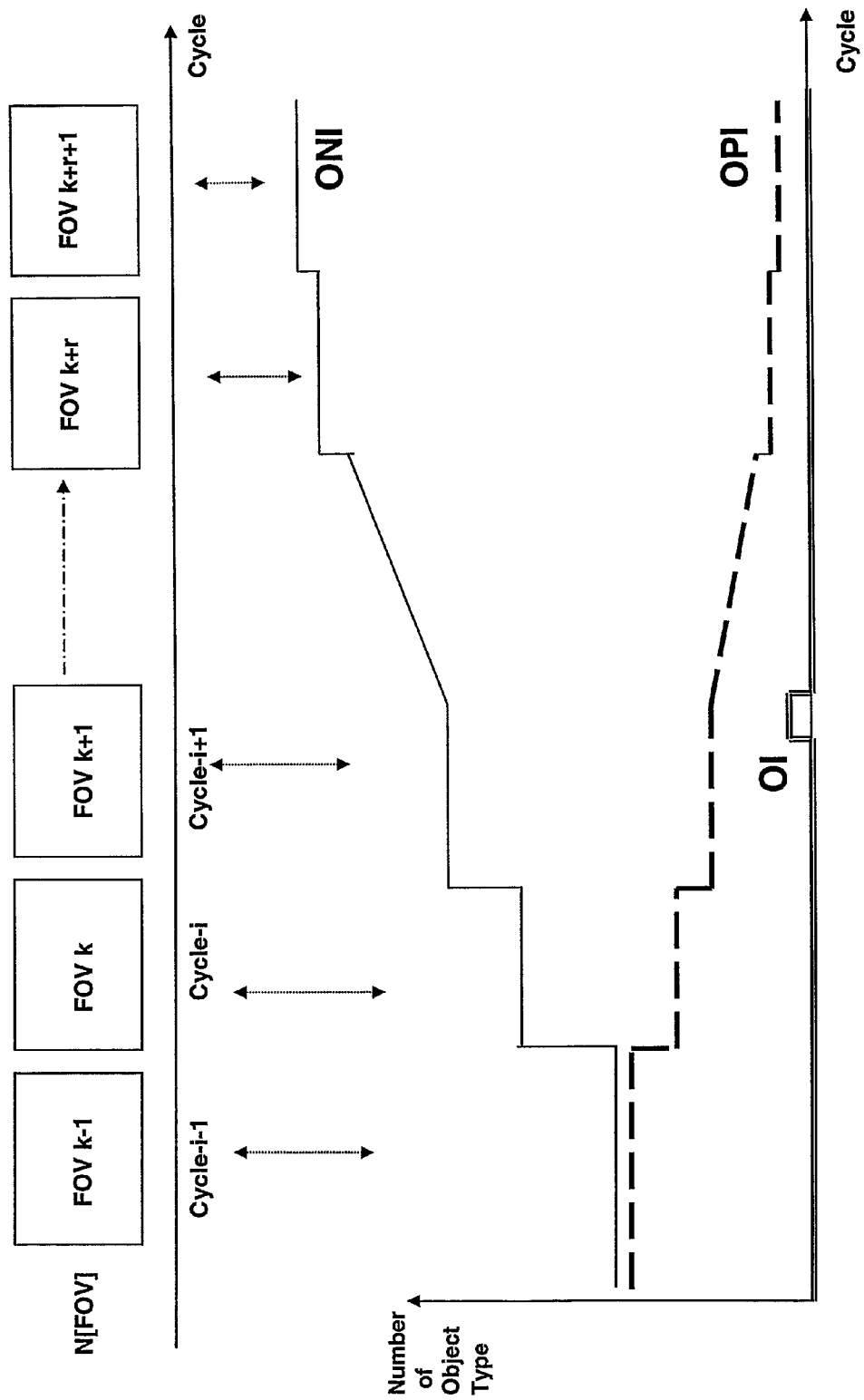
FIG. 2 is a schematic diagram graphically illustrating implementation of a preferred embodiment of the method of processing and analyzing hyper-spectral image data and information via dynamic database updating, as shown in FIG. 1, as a function of a plurality of cycles, in accordance with the present invention.

The present invention relates to hyper-spectral imaging, in general, generating and collecting hyper-spectral images, and, processing and analyzing hyper-spectral image data and information, in particular. More particularly, the present invention relates to a method of processing and analyzing hyper-spectral image data and information via dynamic database updating.

The scope of application of the present invention is directed to, and focused on, the domain or stage of main activities or procedures of a hyper-spectral imaging and analysis application, i.e., being based on, and involving, processing and analyzing generated and collected hyper-spectral image data and information. More specifically, wherein the processing and analyzing of hyper-spectral image data and information are based on, and involve, an integrated combination of: (i) real time or/and non-real time automatic (i.e., computerized) data and information manipulating, handling, or/and moving, types of procedures or/and operations, and (ii) real time or/and non-real time automatic (i.e., computerized) data and information analyzing, identifying (recognizing), discriminating, comparing, filtering, sorting, quantifying, characterizing, and classifying, types of procedures or/and operations.

The generalized method of processing and analyzing hyper-spectral image data and information via dynamic database updating, of the present invention, includes the following main steps or procedures: (a) identifying objects of non-interest, and objects of potential interest, from a sub-set of the hyper-spectral image data and information, by processing and analyzing hyper-spectral images and emission spectra of objects within the data and information sub-set, wherein step (a) includes using a first reference object database of hyper-spectral image data, information, and parameters, and, a second reference object database of biological, chemical, or/and physical data, information, and parameters; (b) determining: (1) absence or presence of objects of interest, (2) additional objects of non-interest, and (3) non-classifiable objects of potential interest, from the identified objects of potential interest, by processing and analyzing the identified objects of potential interest; (c) forming an updated first reference object database and an updated second reference object database, by using results of steps (a) and (b); (d) repeating steps (a) through (c) for next sub-set of the hyper-spectral image data and information, by using the updated first reference object database and the updated second reference object database; and (e) repeating step (d) for a number of the next sub-sets of the hyper-spectral image data and information.

The method of the present invention is implementable or operable, during real time (i.e., in-line or on-line) or/and during non-real time (i.e., off-line), for optimally and highly efficiently, integrating the two main activities of processing, and analyzing, hyper-spectral image data and information, namely, (i) automatic (i.e., computerized) data and information manipulating, handling, or/and moving, types of procedures or/and operations, and, (ii) automatic (i.e., computerized) data and information analyzing, identifying (recognizing), discriminating, comparing, filtering, sorting, quantifying, characterizing, and classifying, types of procedures or/and operations. Moreover, the method of the present invention is implementable or operable for integrating the varied and numerous hyper-spectral image data and information processing and analyzing procedures or/and operations with the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner.

Additionally, the method of the present invention is implementable or operable for achieving the main goal of relating and translating the hyper-spectral image data and information of imaged objects to micro scale or/and macro scale (qualitative or/and quantitative) biological, chemical, or/and physical, characteristics, properties, and behavior, of the imaged objects which are readily interpretable, understandable, and further usable, by a human operator (observer, viewer, analyzer, or/and controller) of a process involving the imaged objects.

Additionally, the method of the present invention is implementable or operable for being generally applicable to essentially any type, kind, or number, of objects (entities, materials, substances, or structures), as part of a scene, which are subjected to a hyper-spectral imaging process or technique. Moreover, wherein the objects are definable and characterizable by a set of a wide variety of numerous possible biological, chemical, or/and physical, properties, characteristics, and behavior.

Additionally, the method of the present invention is implementable or operable for being generally applicable to processing and analyzing hyper-spectral image data and information of hyper-spectral images of objects which are generated and collected from the objects emitting electromagnetic radiation having wavelengths and frequencies associated with different portions or bands, or bands therein, of an entire spectrum emitted by the objects, such as the ultra-violet (UV) band, the visible (VIS) band, the infra-red (IR) band, and the deep infra-red band.

Additionally, the method of the present invention is implementable or operable for being generally applicable to processing and analyzing hyper-spectral image data and information of hyper-spectral imaging and analysis applications involving automatically generating and collecting relatively large numbers (e.g., on the order of hundreds, thousands, or millions) of individual hyper-spectral images (each containing a plurality of emission spectra, spectral fingerprints, and spectral patterns), typically, via a plurality of different fields of view, of a plurality of scenes, wherein each scene includes or contains a single object, or a plurality, collection, or ensemble, of several objects (i.e., entities, materials, substances, or structures).

Additionally, the method of the present invention is implementable or operable for being generally applicable to processing and analyzing hyper-spectral image data and information of hyper-spectral imaging and analysis applications wherein the majority of imaged scenes include or contain an exceptionally relatively small number of objects of interest (targets) compared to a relatively large number of objects of non-interest (high or noisy background). For example, such cases wherein the fraction or concentration of the objects of interest (targets), relative to all objects [of non-interest (background) and of interest (targets)] of (included or contained in) an imaged scene, corresponds to as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-10}$% [1 part per trillion (pptr)].

Additionally, the method of the present invention is implementable or operable for being generally applicable to processing and analyzing hyper-spectral image data and information of hyper-spectral imaging and analysis applications which require distinguishing or resolving quite similar, or even nearly identical, hyper-spectral image data, information, and parameters, in relation to significantly different biological, chemical, or/and physical data, information, and parameters, of objects in imaged scenes.

Additionally, the method of the present invention is implementable or operable for being generally applicable to processing and analyzing hyper-spectral image data and information of hyper-spectral imaging and analysis applications according to various different speeds or time scales. For example, wherein such hyper-spectral imaging and analysis applications which, by definition, and in accordance with the particular characteristics, needs, or requirements, necessarily require that processing and analyzing hyper-spectral image data and information be performed at exceptionally high speeds, for example, on the order of thousands or millions of data or/and information items per second, or, equivalently, at exceptionally short time scales, for example, on the order of milliseconds (msec) or microseconds (μsec) per data or/and information operation.

Additionally, the method of the present invention is implementable or operable for being generally applicable to processing and analyzing hyper-spectral image data and information of hyper-spectral images of objects which are generated and collected by using various different types or kinds of hyper-spectral imaging systems, devices, or/and apparatuses, which are operable during real time (i.e., in-line or on-line) or/and during non-real time (i.e., off-line). Accordingly, the method of the present invention is implementable or operable for being generally applicable to, and integratable with, various different types or kinds of physical hardware equipment and instrumentation, and, (computer) software, which comprise a given hyper-spectral imaging system, device, or apparatus, which is operable during real time (i.e., in-line or on-line) or/and during non-real time (i.e., off-line).

Additionally, the method of the present invention is readily commercially applicable to a wide variety of different fields and areas of technology, and associated applications thereof, which either are, or may be, based on, involve, or benefit from the use of, hyper-spectral imaging, in general, generating and collecting hyper-spectral images, and, processing and analyzing hyper-spectral image data and information, in particular.

The present invention successfully addresses and overcomes various significant problems and limitations, and widens the scope, of presently known techniques and methods of processing and analyzing hyper-spectral image data and information.

The method of processing and analyzing hyper-spectral image data and information via dynamic database updating, of the present invention, is based on uniquely using, and dynamically updating, a first reference object database of hyper-spectral image data, information, and parameters, and, a second reference object database of biological, chemical, or/and physical data, information, and parameters, during real time or/and during non-real time processing and analyzing of the hyper-spectral image data and information.

The method of the present invention, is also based on uniquely using sub-sets of the hyper-spectral image data and information for associating and correlating spectral representations, such as spectral fingerprint or signature pattern types of identification and characterization, of the imaged objects, with elements in the first reference object database of hyper-spectral image data, information, and parameters, and, with elements in the second reference object database of biological, chemical, or/and physical data, information, and parameters.

It is to be understood that the present invention is not limited in its application to the details of the order or sequence, and number, of procedures, steps, and sub-steps, of operation or implementation of the method, or to the details of type, composition, construction, arrangement, order, and number, of exemplary system units, system sub-units, devices, assemblies, sub-assemblies, mechanisms, structures, components, elements, and configurations, and, peripheral equipment, utilities, accessories, and materials, of exemplary systems or devices, set forth in the following illustrative description, and accompanying drawings, unless otherwise specifically stated herein. For example, the following illustrative description generally refers to 'objects', in order to illustrate implementation of the present invention. Herein, the term 'object' as used for illustratively describing the present invention is considered synonymous with, at least part of an entity, material, substance, or structure, which, singly or in combination with other objects (entities, materials, substances, or structures), typically as part of a scene (defined hereinbelow), is subjected to a hyper-spectral imaging process or technique. In general, such an object is definable and characterizable by a set of a wide variety of numerous possible biological, chemical, or/and physical, properties, characteristics, and behavior. Accordingly, the present invention is capable of other embodiments and of being practiced or carried out in various ways. Although procedures, steps, sub-steps, and exemplary system units, system sub-units, devices, assemblies, sub-assemblies, mechanisms, structures, components, elements, and configurations, and, peripheral equipment, utilities, accessories, and materials, which are equivalent or similar to those illustratively described herein can be used for practicing or testing the present invention, suitable procedures, steps, sub-steps, and exemplary system units, system sub-units, devices, assemblies, sub-assemblies, mechanisms, structures, components, elements, and configurations, and, peripheral equipment, utilities, accessories, and materials, are illustratively described and exemplified herein.

It is also to be understood that all technical and scientific words, terms, or/and phrases, used herein throughout the present disclosure have either the identical or similar meaning as commonly understood by one of ordinary skill in the art to which this invention belongs, unless otherwise specifically defined or stated herein. Phraseology, terminology, and, notation, employed herein throughout the present disclosure are for the purpose of description and should not be regarded as limiting. For example, the following illustrative description refers to hyper-spectral imaging, and hyper-spectral images of scenes of (including or containing) objects, in order to illustrate implementation of the present invention.

Moreover, all technical and scientific words, terms, or/and phrases, introduced, defined, described, or/and exemplified, in the above Background section, are equally or similarly applicable in the illustrative description of the preferred embodiments, examples, and appended claims, of the present invention.

Procedures, steps, sub-steps, and, equipment and materials, system units, system sub-units, devices, assemblies, sub-assemblies, mechanisms, structures, components, elements, and configurations, and, peripheral equipment, utilities, accessories, and materials, as well as operation and implementation, of exemplary preferred embodiments, alternative preferred embodiments, specific configurations, and, additional and optional aspects, characteristics, or features, thereof, of a method of processing and analyzing hyper-spectral image data and information via dynamic database updating, according to the present invention, are better understood with reference to the following illustrative description and accompanying drawings. Throughout the following illustrative description and accompanying drawings, same reference numbers or/and letters refer to same components or elements.

In the following illustrative description of the method of the present invention, included are main or principal procedures, steps, and sub-steps, and, main or principal system units, system sub-units, devices, assemblies, sub-assemblies, mechanisms, structures, components, elements, and configurations, and, peripheral equipment, utilities, accessories, and materials, needed for sufficiently understanding proper 'enabling' utilization and implementation of the disclosed invention. Accordingly, description of various possible preliminary, intermediate, minor, or/and optional, procedures, steps, or/and sub-steps, or/and, system units, system sub-units, devices, assemblies, sub-assemblies, mechanisms, structures, components, elements, and configurations, and, peripheral equipment, utilities, accessories, and materials, of secondary importance with respect to enabling implementation of the invention, which are readily known by one of ordinary skill in the art, or/and which are available in the prior art and technical literature relating to hyper-spectral imaging, in general, generating and collecting hyper-spectral images, and, processing and analyzing hyper-spectral image data and information, in particular, theory, principles, and practices thereof, and, related and associated applications and subjects thereof, such as the more general subject of spectral imaging, are at most only briefly indicated herein.

According to a main aspect of the present invention, there is provision of a method of processing and analyzing hyper-spectral image data and information via dynamic database updating.

Applicable Objects Subjected to the Hyper-Spectral Imaging Process or Technique

The method of the present invention is generally applicable to essentially any type or kind, and number, of objects. As stated hereinabove in the Background section, in the context of the field and art of the present invention, herein, the term 'object' generally refers to, and is considered synonymous with, at least part of an entity, material, substance, or structure, which, singly or in combination with other objects (entities, materials, substances, or structures), typically as part of a scene, is subjected to a hyper-spectral imaging process or technique. In general, such an object is definable and characterizable by a set of a wide variety of numerous possible biological, chemical, or/and physical, properties, characteristics, and behavior, only a few examples of which are briefly described as follows.

For example, in general, such an object is composed of organic or/and inorganic chemical species or components. In general, such an object either is, or is derived from, living matter (e.g., plant, animal, or human, matter which is living), or/and non-living matter (e.g., mineral, plant, animal, or human, matter which is non-living). Such an object which either is, or is derived from, plant, animal, or human, matter, either is, or is derived from, a biological moiety, where, herein, a biological moiety generally refers to a part or portion (of indefinite size or/and structure) of a biological entity, and wherein a biological entity refers to an entity, a material, a substance, or a structure, originating or derived from a biological (human, animal, or plant) organism. In general, a given object is in a gaseous, liquid, or/and solid, phase or form. In general, a given object either is, or contains, particulate matter or particulate-like matter (i.e., matter having particle-like features, characteristics, properties, and behavior). In general, at a given instant of time, a given object is fixed or immobile, or, moving or mobile, with respect to a fixed reference point defined by a set of fixed position coordinates (e.g., x, y, and z, position coordinates) within a scene of the object.

Object Interaction with Electromagnetic Radiation During Hyper-Spectral Imaging

In general, when electromagnetic radiation, for example, in the form of light such as that supplied by the sun, or by a man-made imaging type of illuminating or energy source, such as that used during hyper-spectral imaging, is incident upon an object, the electromagnetic radiation is affected by one or more of the biological, chemical, or/and physical, species or components making up the object, by any combination of electromagnetic radiation absorption, diffusion, reflection, diffraction, scattering, or/and transmission, mechanisms. Moreover, an object whose composition includes organic chemical species or components, ordinarily exhibits some degree or extent of fluorescent or/and phosphorescent properties, characteristics, and behavior, when illuminated by some type of electromagnetic radiation or light, such as ultra-violet (UV), visible (VIS), or infrared (IR), types of light. The affected electromagnetic radiation, in the form of diffused, reflected, diffracted, scattered, or/and transmitted, electromagnetic radiation emitted by, or/and emerging from, the object, for example, via fluorescence or/and phosphorescence, is directly and uniquely related to the biological, chemical, or/and physical, properties, characteristics, and behavior, of the object, in general, and of the chemical species or components making up the object, in particular, and therefore represents a spectral ('fingerprint' or 'signature') pattern type of identification of the object. Such spectrally based characteristics, behavior, and phenomena, of objects are the basis of enabling implementation of the method of processing and analyzing hyper-spectral image data and information, of the present invention.

Applicable Hyper-Spectral Imaging and Analysis Systems, Devices, Apparatuses, and Main Components Thereof In general, for implementing the method of the present invention, the hyper-spectral image data and information are generated and collected during real time (i.e., in-line or on-line) or/and during non-real time (i.e., off-line). During hyper-spectral imaging, an object or objects, typically as part of a scene, is/are exposed to natural or/and man-made electromagnetic radiation, followed by generation and collection of multiple spectral (i.e., hyper-spectral) images, via a single field of view, or via a plurality of fields of view, of the object(s) emitting electromagnetic radiation having wavelengths and frequencies associated with different selected (relatively narrow) portions or bands, or bands therein, of an entire spectrum emitted by the object(s).

For example, for implementing the method of the present invention, hyper-spectral images of an object or of objects are generated and collected from the object(s) emitting electromagnetic radiation having wavelengths and frequencies associated with one or more of the following portions or bands, or bands therein, of an entire spectrum emitted by the object(s): the ultra-violet (UV) band, spanning the wavelength range of about 100-350 nanometers; the visible (VIS) band, spanning the wavelength range of about 400-700 nanometers [blue band: about 400-500 nm, green band: about 500-600 nm, red band: about 600-700 nm]; the infra-red (IR) band, spanning the wavelength range of about 800-1200 nanometers; and the deep infra-red band, spanning the wavelength range of about 3-12 microns. Such hyper-spectral images generated by, and collected from, the imaged object(s), correspond to spectral 'fingerprint' or 'signature' pattern types of identification and characterization of the imaged object(s), which, subsequently, are processed and analyzed in accordance with the method of the present invention.

In general, for implementing the method of the present invention, the hyper-spectral image data and information are generated and collected, during real time (in-line or on-line) or/and during non-real time (off-line), by using essentially any type or kind of hyper-spectral imaging system, device, or/and apparatus, which is operable during real time or/and during non-real time. Such a hyper-spectral imaging system, device, or/and apparatus, is/are of appropriate design and construction, and operates, for performing main tasks of generating, detecting, measuring, acquiring, collecting, processing, analyzing, and preferably, displaying, a wide variety of different types of hyper-spectral image data and information.

For performing these tasks, a generalized hyper-spectral imaging and analysis system, device, or/and apparatus, preferably, includes as main components: (i) an illuminating unit, for generating and optically supplying electromagnetic radiation to individual objects among a plurality, collection, or ensemble, of several objects (i.e., entities, materials, substances, or structures) of (included or contained in) the surroundings or place of each scene which is imaged in a plurality of hyper-spectral images, via one or more fields of view, for forming illuminated objects; (ii) a hyper-spectral imaging unit, for optically detecting the affected energies or emission beams emitted by, and emerging from, illuminated objects, and for generating optical forms of hyper-spectral images of the illuminated objects of the imaged scenes; (iii) a hyper-spectral image converting unit, for converting the optical forms of the hyper-spectral images to corresponding electronic forms of the hyper-spectral images; and (iv) a central programming and control/data/information signal processing unit (CPPU), for centrally programming and processing control, data, and information, signals, of the units and components thereof, of the hyper-spectral imaging and analysis system, device, or/and apparatus.

Optionally, the hyper-spectral imaging and analysis system, device, or/and apparatus, further includes a synchronizing unit, for synchronizing overall operation and operating parameters of the units and components thereof, of the hyper-spectral imaging and analysis system, device, or/and apparatus, singly, in combination with each other, and, optionally, in combination with peripheral, auxiliary, or/and external, equipment (hardware or/and software) and, operation and operating parameters thereof.

Optionally, the hyper-spectral imaging and analysis system, device, or/and apparatus, further includes an operator workstation unit, for enabling an operator to send operating commands, instructions, and data, to the central programming and control/data/information signal processing unit (CPPU), as well as to receive data and information from the CPPU, during real time (in-line or on-line) or/and during non-real time (off-line) operation of the hyper-spectral imaging and analysis system, device, or/and apparatus.

For implementing the method of the present invention, during real time (in-line or on-line) or/and during non-real time (off-line), in the above described generalized hyper-spectral imaging and analysis system, device, or/and apparatus, each of the illuminating unit, the hyper-spectral imaging unit, and the hyper-spectral image converting unit, is operatively (electrically or/and electronically) connected to the central programming and control/data/information signal processing unit (CPPU), and to the other units, as needed, and optionally, to the optional synchronizing unit, or/and to the optional operator workstation unit, via appropriate data and information input/output (I/O) signal paths and junctions.

Each of the several above stated main components, and optional components, of an applicable hyper-spectral imaging and analysis system, device, or/and apparatus, preferably, is of design and construction, and operates, for providing the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner. Additionally, each of the several above stated main components, and optional components, of an applicable hyper-spectral imaging and analysis system, device, or/and apparatus, preferably, provides high performance, including, for example, relatively high resolution at high speed (short time scale), along with providing low false positive and false negative error rates.

In general, the hyper-spectral imaging unit is essentially any type of device, mechanism, or assembly, which is capable of operating as just described. For example, the hyper-spectral imaging unit is designed, constructed, and operative, as an optical interferometer, which optically detects affected energy or emission beams, emitted by, and emerging from, illuminated objects, in the form of whole images, and then optically processes the whole images for generating optical forms of hyper-spectral images of the illuminated objects of (included or contained in) the imaged scenes.

For example, preferably, the hyper-spectral imaging unit is appropriately designed, constructed, and operative, according to a high performance, high resolution high speed (short time scale) hyper-spectral mode of hyper-spectral imaging and analysis, for example, as illustratively described [20] by the same applicant of the present invention. Such a hyper-spectral imaging unit has spectral and spatial resolutions on the order of less than about 30 nm, for example, on the order of about 5 nm. As disclosed therein, such a hyper-spectral imaging unit involves the use of a specially designed, constructed, and operative, piezoelectric optical interferometer, based on using piezoelectric technology with closed loop control and analysis algorithms, for enabling real time high resolution high speed nanometer accuracy movement of a movable mirror in the optical interferometer, along with using a specially designed and constructed optical interferometer mount as part of the optical interferometer, for achieving high thermo-mechanical stability of mounted optical interferometer components during real time hyper-spectral imaging of objects.

As further disclosed therein, operation of such a hyper-spectral imaging unit involves using a specially designed optical path distance (OPD) calibration procedure, and image processing software algorithms, for enabling high speed (on the order of less than about 100 milliseconds scanning per image) generating of high spectral and spatial resolution (for example, on the order of less than about 5 nm) interferogram images, which in turn would be used for synthesizing and analyzing high resolution highly reproducible three-dimensional hyper-spectral (cube) images of objects of (included or contained in) the imaged scenes.

Alternatively, for example, the hyper-spectral imaging unit is designed, constructed, and operative, as a dispersion prism, which optically detects the affected energies or emission beams emitted by, and emerging from, the illuminated objects, in the form of single lines of a whole image, and then optically processes the single lines of the whole images for generating optical forms of hyper-spectral images of the illuminated objects of the imaged scenes.

The hyper-spectral imaging unit can include components designed, constructed, and operative, according to multiplexing/demultiplexing (demux) fiber optics technology. In particular, an exemplary embodiment of such a hyper-spectral imaging unit includes a 'detecting' bundle of a plurality of individual or demultiplexed flexible fiber optic tubes which is operatively connected to an illuminating bundle of a plurality of flexible fiber optic tubes of an illuminating unit. The detecting bundle of flexible fiber optic tubes is positioned relative to the output of the illuminating unit and to objects of (included or contained in) a scene, in a manner such that the detecting bundle of flexible fiber optic tubes detects, receives, and then transmits (forwards), individual or demultiplexed optically detected affected energies or emission beams, emitted by, and emerging from, the illuminated objects, in the form of whole images, or in the form of single lines of a whole image, to other components of the hyper-spectral imaging unit, which then optically process the whole images, or the single lines of whole images, respectively, for generating optical forms of hyper-spectral images of illuminated objects of the imaged scenes.

In the above described generalized hyper-spectral imaging and analysis system, device, or/and apparatus, the hyper-spectral image converting unit is for converting the optical forms of the hyper-spectral images to corresponding electronic forms of the hyper-spectral images of the illuminated objects in the imaged scenes. In general, the hyper-spectral image converting unit is essentially any type of device, mechanism, or assembly, which is capable of operating as just described. For example, the hyper-spectral image converting unit is designed, constructed, and operative, as a plurality of line detectors/cameras, or alternatively, as a CCD (charged coupled detector) type of detector/camera, or alternatively, as a diode array type of detector/camera, each of which converts the optical forms of the hyper-spectral images to corresponding electronic forms of the hyper-spectral images of the illuminated objects in the imaged scenes. For example, the image exposure time of the detector/camera device, mechanism, or assembly, of the hyper-spectral image converting unit is, preferably, in a range of between about 0.1 millisecond and about 5 milliseconds, and the image conversion time of the spectral image converting unit is, preferably, in a range of between about 1 millisecond and about 10 milliseconds.

In the above described generalized hyper-spectral imaging and analysis system, device, or/and apparatus, the central programming and control/data/information signal processing unit (CPPU) is for centrally programming and processing control, data, and information, signals, of the units and components thereof, of the hyper-spectral imaging and analysis system, device, or/and apparatus. Accordingly, control, data, and information, signals, of the units and components thereof, of the hyper-spectral imaging and analysis system, device, or/and apparatus, are centrally programmed and processed by the central programming and control/data/information signal processing unit (CPPU).

In particular, control, data, and information, signals, of the illuminating unit, of the spectral imaging unit, and of the spectral image converting unit, and optionally, of the optional synchronizing unit, and optionally, of the optional operator workstation unit, of the hyper-spectral imaging and analysis system, device, or/and apparatus, which are sent and received via appropriate data and information input/output (I/O) signal paths and junctions, are centrally programmed and processed by the central programming and control/data/information signal processing unit (CPPU).

More specifically, the central programming and control/data/information signal processing unit (CPPU) is for centrally programming and processing control, data, and information, signals, associated with: (1) incident electromagnetic radiation generated and optically supplied by the illuminating unit to the objects of (included or contained in) the imaged scenes; (2) affected energies or emission beams emitted by, and emerging from, the illuminated objects, which are optically detected and processed by the hyper-spectral imaging unit, for generating optical forms of hyper-spectral images of the illuminated objects of the imaged scenes; and (3) optical forms of the hyper-spectral images of the illuminated objects, which are generated by the hyper-spectral imaging unit, and are converted to corresponding electronic forms of the hyper-spectral images, by the hyper-spectral image converting unit.

The central programming and control/data/information signal processing unit (CPPU) is also for centrally programming and processing control, data, and information, signals, associated with optional, and preferable, synchronization of overall operation and operating parameters of the units and components thereof, of the hyper-spectral imaging and analysis system, singly, in combination with each other, and, optionally, in combination with peripheral, auxiliary, or/and external, equipment (hardware or/and software) and, operation and operating parameters thereof, by the optional synchronizing unit.

The central programming and control/data/information signal processing unit (CPPU) includes all the necessary software, including operatively connected and functioning written or printed data, in the form of software programs, software routines, software sub-routines, software symbolic languages, software code, software instructions or protocols, software algorithms, or/and a combination thereof, and includes all the necessary hardware, for centrally programming and processing control, data, and information, signals, which are associated with performing the above described functions and operations of the hyper-spectral imaging and analysis system, and which are associated with implementing and practicing the hereinbelow illustratively described method of processing and analyzing hyper-spectral image data and information via dynamic database updating.

In particular, the central programming and control/data/information signal processing unit (CPPU) includes all the necessary software for performing the steps or procedures of the method of the present invention, during real time (in-line or on-line) or/and during non-real time (off-line), for optimally and highly efficiently, integrating the two main activities of processing, and analyzing, hyper-spectral image data and information, namely, (i) automatic (i.e., computerized) data and information manipulating, handling, or/and moving, types of procedures or/and operations, and, (ii) automatic (i.e., computerized) data and information analyzing, identifying (recognizing), discriminating, comparing, filtering, sorting, quantifying, characterizing, and classifying, types of procedures or/and operations.

Conversely, the method of the present invention is implementable or operable for being generally applicable to, and integratable with, various different types or kinds of physical hardware equipment and instrumentation, and, (computer)

software, which comprise a given hyper-spectral imaging system, device, or apparatus, which is operable during real time or/and during non-real time.

For implementing the method of the present invention, main or principal procedures, steps, and sub-steps, are performed by including the use of the same or/and specially modified methodologies of automatic pattern recognition (APR) and classification types of spectral or hyper-spectral image data and information processing and analyzing which are described in same applicant/assignee prior disclosures [e.g., 21-25], and described in references cited therein. This is especially the case where, for example, a particular biological, chemical, or/and physical, object (entity, material, substance, or structure) of (included or contained in) an imaged scene either is, or contains, particulate matter or particulate-like matter (i.e., matter having particle-like features, characteristics, properties, and behavior).

For performing the automatic pattern recognition (APR) and classification types of spectral or hyper-spectral image data and information processing and analyzing, there is applying one or more image analysis algorithms, such as detection, pattern recognition and classification, and/or decision image analysis algorithms, to the hyper-spectral image data and information. The imaged scenes include or contain hyper-spectral image data and information relating to the imaged object(s), particularly in the form of spectral representations, such as spectral fingerprint or signature pattern types of identification and characterization, of the imaged object(s).

Figure 3:
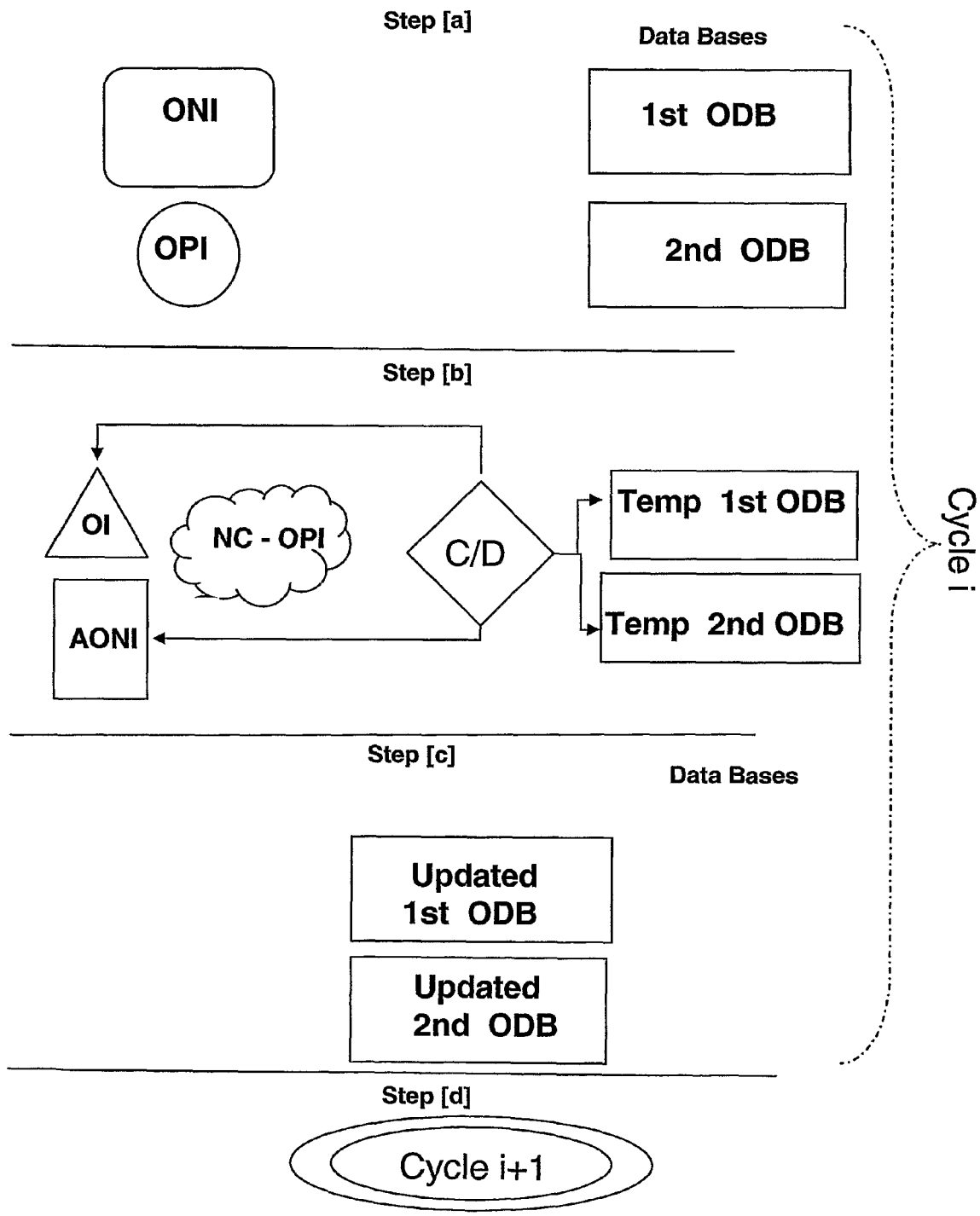
FIG. 3 is a schematic diagram illustrating implementation of a preferred embodiment of the method of processing and analyzing hyper-spectral image data and information via dynamic database updating, as shown in FIG. 1, for a single cycle i, in accordance with the present invention.

Referring now to the drawings, FIG. 1 is a (block type) flow diagram of the main steps or procedures of a preferred embodiment of the method of processing and analyzing hyper-spectral image data and information via dynamic database updating, of the present invention. In FIG. 1, each generally applicable, main step or procedure of the method of the present invention is enclosed inside a frame (block). FIG. 2 is a schematic diagram graphically illustrating implementation of a preferred embodiment of the method of processing and analyzing hyper-spectral image data and information via dynamic database updating, as shown in FIG. 1, as a function of a plurality of cycles. FIG. 3 is a schematic diagram illustrating implementation of a preferred embodiment of the method of processing and analyzing hyper-spectral image data and information via dynamic database updating, as shown in FIG. 1, for a single cycle i. Phraseology, terminology, and, notation, appearing in the following illustrative description are consistent with those appearing in the flow diagram illustrated in FIG. 1.

In Step (a) of the method of processing and analyzing hyper-spectral image data and information via dynamic database updating, there is identifying objects of non-interest, and objects of potential interest, from a sub-set of the hyper-spectral image data and information.

Step (a) is performed by processing and analyzing emission type spectral representations of objects within the data and information sub-set. Step (a) includes using a first reference object database of hyper-spectral image data, information, and parameters, and, a second reference object database of biological, chemical, or/and physical data, information, and parameters.

Imaged Scene of Objects in the Hyper-Spectral Imaging

The hyper-spectral image data and information of a single object, or of a plurality of objects, as part of a scene, are generated and collected during real time (in-line or on-line) or/and during non-real time (off-line), in order to ultimately obtain micro scale or/and macro scale (qualitative or/and quantitative) biological, chemical, or/and physical, characteristics, properties, and behavior, of the imaged object(s) which are readily interpretable, understandable, and further usable, by a human operator (observer, viewer, analyzer, or/and controller) of a process involving the imaged object(s) in the scene. As stated hereinabove in the Background section, a scene generally refers to surroundings or a place of (i.e., including or containing) a single object, or, a plurality, collection, or ensemble, of several objects (i.e., entities, materials, substances, or structures), wherein takes place or occurs an action or event involving one or more object(s). Accordingly, in the context of the field and art of the present invention, for implementing the method of the present invention, an imaged scene generally corresponds to one or more hyper-spectral images, associated with one or more fields of view, of surroundings or a place of (i.e., including or containing) a single object, or, a plurality, collection, or ensemble, of several objects (i.e., entities, materials, substances, or structures), wherein takes place or occurs an action or event involving one or more imaged object(s). Moreover, in the method of the present invention, an imaged scene includes or contains hyper-spectral image data and information relating to the imaged object(s), particularly in the form of spectral representations, such as spectral fingerprint or signature pattern types of identification and characterization, of the imaged object(s).

Types, Categories, or Classes, of Objects in the Hyper-Spectral Imaged Scenes

In an exemplary preferred embodiment of the method of the present invention, in general, a scene can be considered as including or containing any number of objects which are typed, categorized, or classified, according to three (and not just two, as in prior art teachings) main different types, categories, or classes, of objects. Namely, (1) objects of non-interest, (2) objects of interest, and (3) objects of 'potential' interest, each of which is basically defined as follows. In the first type, category, or class, of objects, objects of non-interest correspond to objects of (included or contained in) a scene which are not of interest to a human operator (observer, viewer, analyzer, or/and controller) of a process involving the objects. In the second type, category, or class, of objects, objects of interest correspond to objects of (included or contained in) a scene which are of interest to a human operator of a process involving the objects. In the third type, category, or class, of objects, objects of potential interest correspond to objects of (included or contained in) a scene which are of potential interest to a human operator of a process involving the objects.

For further understanding the significantly different meanings and attributes of the three main different types, categories, or classes, of objects, in the context of the field and art of the present invention, objects of non-interest may be considered as being 'background' of, or within, a scene. Objects of interest may be considered as being 'targets' of, or within, a scene. Objects of potential interest may be considered as being potential 'targets' of, or within, a scene, or, conversely, as being potential 'background' of, or within, a scene.

Accordingly, in the hyper-spectral image data and information, individual objects among a plurality, collection, or ensemble, of several objects (i.e., entities, materials, substances, or structures) of (included or contained in) the surroundings or place of a scene which is imaged in one or more hyper-spectral images, via one or more fields of view, can be typed, categorized, or classified, according to the above described three main different types, categories, or classes, of objects, i.e., objects of non-interest (i.e., background), objects of interest (i.e., targets), and objects of potential interest (i.e., potential targets, or, conversely, potential background).

A scene which is imaged in one or more hyper-spectral images, via one or more fields of view, includes or contains a plurality, collection, or ensemble, of several objects (i.e., entities, materials, substances, or structures), wherein, there exists a number of objects which are objects of non-interest (background), or/and objects of interest (targets), or/and objects of potential interest (potential targets or background). Typically, each imaged scene includes or contains a distribution of different relative numbers of these three main different types, categories, or classes, of objects. For example, a given imaged scene may include or contain a distribution of a relatively large number of objects of non-interest (corresponding to a relatively high or 'noisy' background), a relatively small number of objects of interest (targets), or/and a relatively small number of objects of potential interest (potential targets or background). Conversely, a given imaged scene may include or contain a distribution of a relatively small number of objects of non-interest (corresponding to a relatively low or 'quiet' background), a relatively large number of objects of non-interest (targets), or/and a relatively large number of objects of potential interest (potential targets or background).

Moreover, for example, there are many hyper-spectral imaging and analysis applications wherein the majority of imaged scenes include or contain an 'exceptionally' relatively small number of objects of interest (targets) compared to a relatively high number of objects of non-interest (high or noisy background). For example, such cases are wherein the fraction or concentration of the objects of interest (targets), relative to all objects [of non-interest (background) and of interest (targets)] of (included or contained in) an imaged scene, corresponds to as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-1}$% [1 part per trillion (pptr)].

In addition to imaged scenes including or containing distributions of different relative numbers of the three main different types, categories, or classes, of objects, as described and exemplified hereinabove, each imaged object is definable and characterizable by a set of a wide variety of numerous possible biological, chemical, or/and physical, properties, characteristics, and behavior. For example, in a given imaged scene, there may exist different types, kinds, and numbers, of objects whose 'hyper-spectral' data, information, and parameters, are quite similar, or even nearly identical, i.e., barely distinguishable or resolvable, but whose 'biological, chemical, or/and physical' data, information, and parameters (in terms of properties, characteristics, or/and behavior), are significantly different, and not at all similar or nearly identical, i.e., easily distinguishable or resolvable, or vice versa. Thus, arises the need for distinguishing or resolving the quite similar, or even nearly identical, hyper-spectral image data, information, and parameters, in relation to the significantly different biological, chemical, or/and physical data, information, and parameters, of the objects in the imaged scenes.

Each of the three main different general types, categories, or classes, of objects of (included or contained in) a scene is definable or characterizable by one or more sets of a priori or pre-determined known data, information, and parameters, (e.g., in the form of databases of theoretically or/and empirically determined data, information, and parameters) and rules for using thereof, which are obtained and established by a human operator of a process involving the objects of (included or contained in) the scene. For example, such sets of a priori or pre-determined known data, information, and parameters, are typically based on databases of theoretically or/and empirically determined 'hyper-spectral' data, information, and parameters, and, on databases of theoretically or/and empirically determined 'biological, chemical, or/and physical' data, information, and parameters, which are associatable and correlatable with the objects of the scene, and which are applicable for uniquely identifying (recognizing), discriminating, comparing, filtering, sorting, quantifying, characterizing, and classifying, the objects of the scene.

Step (a) is performed by processing and analyzing hyper-spectral images and emission spectra of objects within the data and information sub-set. Step (a) includes using a first reference object database of hyper-spectral image data, information, and parameters, and, a second reference object database of biological, chemical, or/and physical data, information, and parameters.

The first reference object database of hyper-spectral image data, information, and parameters, includes theoretically or/and empirically determined data, information, and parameters, of, relating to, or/and associated with, the various different spectral properties, characteristics, and behavior, of various different types and kinds of imaged reference objects listed or indexed in a dynamically updatable reference list or index of reference objects. Exemplary types of theoretically or/and empirically determined data, information, and parameters, are: (i) pixel intensity, (ii) signal-to-noise (S/N) ratio, (iii) image sharpness, (iv) spectral distances, and, (v) electromagnetic radiation type emission spectral representations, such as spectral fingerprint or signature pattern types of identification and characterization of the various different types and kinds of imaged reference objects listed or indexed in the dynamically updatable reference list or index of reference objects.

The second reference object database of biological, chemical, or/and physical data, information, and parameters, includes theoretically or/and empirically determined data, information, and parameters, of, relating to, or/and associated with, the various different biological, chemical, or/and physical properties, characteristics, and behavior, of the same various different types and kinds of imaged reference objects listed or indexed in the dynamically updatable reference list or index of reference objects. Exemplary types of theoretically or/and empirically determined data, information, and parameters, are: (i) biological, chemical, or/and physical, composition, of the various different types and kinds of imaged reference objects listed or indexed in the dynamically updatable reference list or index of reference objects and, (ii) object morphology such as object size, shape, form, or/and configuration, of the various different types and kinds of imaged reference objects listed or indexed in the dynamically updatable reference list or index of reference objects.

In Step (a), for performing the automatic pattern recognition (APR) and classification types of spectral or hyper-spectral image data and information processing and analyzing, there is applying one or more image analysis algorithms, such as detection, pattern recognition and classification, and/or decision image analysis algorithms, to the sub-set of hyper-spectral image data and information. The sub-set of hyper-spectral image data and information relates to the imaged objects, particularly in the form of spectral representations, such as spectral fingerprint or signature pattern types of identification and characterization, of the imaged objects.

More specifically, the hyper-spectral image data and information relating to the imaged objects, particularly in the form of spectral representations, such as spectral fingerprint or signature pattern types of identification and characterization, of the imaged objects, are associatable and correlatable with elements in the first reference object database of hyper-spectral image data, information, and parameters, and, are associatable and correlatable with elements in the second reference object database of biological, chemical, or/and physical data, information, and parameters. Such associating and correlating of the objects of the imaged scene, are applicable for uniquely identifying (recognizing), discriminating, comparing, filtering, sorting, quantifying, characterizing, and classifying, the objects of the imaged scene. This enables identifying objects of non-interest, and objects of potential interest, from the sub-set of the hyper-spectral image data and information.

In Step (b), there is determining: (1) absence or presence of objects of interest, (2) additional objects of non-interest, and (3) non-classifiable objects of potential interest, from the identified objects of potential interest.

Step (b) is performed by processing and analyzing the identified objects of potential interest. This involves further using the sub-set of the hyper-spectral image data and information, herein, also referred to as the data and information sub-set, as well as the first reference object database and the second reference object database.

Step (b) includes performing the following sub-steps (i)-(iii):

(i) Forming a 'special' database of the objects of potential interest.

(ii) Comparing and correlating data and information of the special database of sub-step (i) to data and information of the first reference object database of hyper-spectral image data, information, and parameters, and, to the second reference object database of biological, chemical, or/and physical data, information, and parameters.

(iii) Forming a temporary first reference object database of hyper-spectral image data, information, and parameters, and, a temporary second reference object database of biological, chemical, or/and physical data, information, and parameters, by using the results of sub-step (ii).

Main purposes or objectives of performing optional, and preferred, sub-steps (i)-(iii), are for checking and controlling accuracy, precision (reproducibility), and sensitivity, of performing Step (a) and the results formed therefrom. In particular, as relating to minimizing possible occurrence of obtaining false positive or/and false negative results in Step (a).

In Step (c), there is forming an updated first reference object database and an updated second reference object database, by using results of steps (a) and (b).

Accordingly, in Step (c), there is updating the first reference object database of hyper-spectral image data, information, and parameters, and, updating the second reference object database of biological, chemical, or/and physical data, information, and parameters, by using results of steps (a) and (b), for forming an updated first reference object database and an updated second reference object database.

In Step (d), there is repeating Steps (a) through (c) for next sub-set of the hyper-spectral image data and information, by using the updated first reference object database and the updated second reference object database.

Accordingly, in Step (d), there is (i) identifying objects of non-interest, and objects of potential interest, from the next sub-set of the hyper-spectral image data and information, by processing and analyzing emission type spectral representations of objects within the next data and information sub-set; (ii) determining the absence or presence of objects of interest, and of additional objects of non-interest, from the identified objects of potential interest, by processing and analyzing the objects of potential interest identified in (i); and (iii) forming a newly updated first reference object database and a newly updated second reference object database, by using the results of steps (i) and (ii).

Step (d) includes using the first reference object database of hyper-spectral image data, information, and parameters, and, the second reference object database of biological, chemical, or/and physical data, information, and parameters, as previously defined and characterized hereinabove.

In Step (e), there is repeating Step (d) for a number of the next sub-sets of the hyper-spectral image data and information.

Accordingly, in Step (e), for each next sub-set, of a number of next sub-sets of the hyper-spectral image data and information, there is (i) identifying objects of non-interest, and objects of potential interest, from the current next sub-set of the hyper-spectral image data and information, by processing and analyzing emission type spectral representations of objects within the current data and information sub-set; (ii) determining the absence or presence of objects of interest, and of additional objects of non-interest, from the identified objects of potential interest, by processing and analyzing the objects of potential interest identified in (i); and (iii) forming a newly updated first reference object database and a newly updated second reference object database, by using the results of steps (i) and (ii).

In Step (e), there is repeating Step (d), for a number, for example, N, next sub-sets of the hyper-spectral image data and information, of the entire set of the hyper-spectral image data and information which is generated and collected during a particular hyper-spectral imaging and analysis application.

Preferably, the method of the present invention further includes recording, reporting, or/and displaying, the progress and results while each of the above steps is performed, during real time or/and during non-real time.

For example, there is recording, reporting, or/and displaying, the progress and results with respect to the imaged scenes including or containing distributions of different relative numbers of the three main different types, categories, or classes, of objects, i.e., objects of non-interest (background), objects of interest (targets), and objects of potential interest (potential targets or background). Additionally, for example, there is recording, reporting, or/and displaying, the progress and results with respect to the dynamic updating of the first reference object database of hyper-spectral image data, information, and parameters, and, the dynamic updating of the second reference object database of biological, chemical, or/and physical data, information, and parameters. This procedure is particularly useful to a human operator (observer, viewer, analyzer, or/and controller) of a process involving the objects which are subjected to the hyper-spectral imaging and analysis application.

As a result of the integrated processing and analyzing of the hyper-spectral image data and information of the imaged scene of objects, in accordance with the hereinabove described method of the present invention, the hyper-spectral image data and information of the objects can be related and translated to micro scale or/and macro scale (qualitative or/and quantitative) biological, chemical, or/and physical, characteristics, properties, and behavior, of the objects which are readily interpretable, understandable, and further usable, by a human operator of a process involving the objects in the imaged scenes of the hyper-spectral imaging and analysis application.

The present invention, as illustratively described and exemplified hereinabove, has several beneficial and advantageous aspects, characteristics, and features, which are based on or/and a consequence of, the above illustratively described main aspects of novelty and inventiveness.

The method of the present invention is implementable or operable, during real time (i.e., in-line or on-line) or/and during non-real time (i.e., off-line), for optimally and highly efficiently, integrating the two main activities of processing, and analyzing, hyper-spectral image data and information, namely, (i) automatic (i.e., computerized) data and information manipulating, handling, or/and moving, types of procedures or/and operations, and, (ii) automatic (i.e., computerized) data and information analyzing, identifying (recognizing), discriminating, comparing, filtering, sorting, quantifying, characterizing, and classifying, types of procedures or/and operations. Moreover, the method of the present invention is implementable or operable for integrating the varied and numerous hyper-spectral image data and information processing and analyzing procedures or/and operations with the 'ultimate' combination of exceptionally high accuracy, 'and' high precision (reproducibility), 'and' high sensitivity, 'and' at high speed (short time scale), all at the same time (i.e., simultaneously), be it during real time or during non-real time, in an optimum or highly efficient manner.

Additionally, the method of the present invention is implementable or operable for achieving the main goal of relating and translating the hyper-spectral image data and information of imaged objects to micro scale or/and macro scale (qualitative or/and quantitative) biological, chemical, or/and physical, characteristics, properties, and behavior, of the imaged objects which are readily interpretable, understandable, and further usable, by a human operator (observer, viewer, analyzer, or/and controller) of a process involving the imaged objects.

Additionally, the method of the present invention is implementable or operable for being generally applicable to essentially any type, kind, or number, of objects (entities, materials, substances, or structures), as part of a scene, which are subjected to a hyper-spectral imaging process or technique. Moreover, wherein the objects are definable and characterizable by a set of a wide variety of numerous possible biological, chemical, or/and physical, properties, characteristics, and behavior.

Additionally, the method of the present invention is implementable or operable for being generally applicable to processing and analyzing hyper-spectral image data and information of hyper-spectral images of objects which are generated and collected from the objects emitting electromagnetic radiation having wavelengths and frequencies associated with different portions or bands, or bands therein, of an entire spectrum emitted by the objects, such as the ultra-violet (UV) band, the visible (VIS) band, the infra-red (IR) band, and the deep infra-red band.

Additionally, the method of the present invention is implementable or operable for being generally applicable to processing and analyzing hyper-spectral image data and information of hyper-spectral imaging and analysis applications involving automatically generating and collecting relatively large numbers (e.g., on the order of hundreds, thousands, or millions) of individual hyper-spectral images (each containing a plurality of emission spectra, spectral fingerprints, and spectral patterns), typically, via a plurality of different fields of view, of a plurality of scenes, wherein each scene includes or contains a single object, or a plurality, collection, or ensemble, of several objects (i.e., entities, materials, substances, or structures).

Additionally, the method of the present invention is implementable or operable for being generally applicable to processing and analyzing hyper-spectral image data and information of hyper-spectral imaging and analysis applications wherein the majority of imaged scenes include or contain an exceptionally relatively small number of objects of interest (targets) compared to a relatively large number of objects of non-interest (high or noisy background). For example, such cases wherein the fraction or concentration of the objects of interest (targets), relative to all objects [of non-interest (background) and of interest (targets)] of (included or contained in) an imaged scene, corresponds to as low as 1% [1 part per hundred (pph)], or $10^{-1}$% [1 part per thousand (ppt)], or $10^{-4}$% [1 part per million (ppm)], $10^{-7}$% [1 part per billion (ppb)], or even as low as $10^{-10}$% [1 part per trillion (pptr)].

Additionally, the method of the present invention is implementable or operable for being generally applicable to processing and analyzing hyper-spectral image data and information of hyper-spectral imaging and analysis applications which require distinguishing or resolving quite similar, or even nearly identical, hyper-spectral image data, information, and parameters, in relation to significantly different biological, chemical, or/and physical data, information, and parameters, of objects in imaged scenes.

Additionally, the method of the present invention is implementable or operable for being generally applicable to processing and analyzing hyper-spectral image data and information of hyper-spectral imaging and analysis applications according to various different speeds or time scales. For example, wherein such hyper-spectral imaging and analysis applications which, by definition, and in accordance with the particular characteristics, needs, or requirements, necessarily require that processing and analyzing hyper-spectral image data and information be performed at exceptionally high speeds, for example, on the order of thousands or millions of data or/and information items per second, or, equivalently, at exceptionally short time scales, for example, on the order of milliseconds (msec) or microseconds (μsec) per data or/and information operation.

Additionally, the method of the present invention is implementable or operable for being generally applicable to processing and analyzing hyper-spectral image data and information of hyper-spectral images of objects which are generated and collected by using various different types or kinds of hyper-spectral imaging systems, devices, or/and apparatuses, which are operable during real time (i.e., in-line or on-line) or/and during non-real time (i.e., off-line). Accordingly, the method of the present invention is implementable or operable for being generally applicable to, and integratable with, various different types or kinds of physical hardware equipment and instrumentation, and, (computer) software, which comprise a given hyper-spectral imaging system, device, or apparatus, which is operable during real time (i.e., in-line or on-line) or/and during non-real time (i.e., off-line).

The method of the present invention is readily commercially applicable to a wide variety of different fields and areas of technology, and associated applications thereof, which either are, or may be, based on, involve, or benefit from the use of, hyper-spectral imaging, in general, generating and collecting hyper-spectral images, and, processing and analyzing hyper-spectral image data and information, in particular.

Based upon the above indicated aspects of novelty and inventiveness, and, beneficial and advantageous aspects, characteristics, and features, the present invention successfully addresses and overcomes various significant problems and limitations, and widens the scope, of presently known techniques and methods of processing and analyzing hyper-spectral image data and information.

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

While the invention has been described in conjunction with specific embodiments and examples thereof, it is evident that many alternatives, modifications, and variations, will be apparent to those skilled in the art. Accordingly, it is intended to embrace all such alternatives, modifications, and variations, that fall within the scope of the appended claims.

All patents, patent applications, and publications, cited or referred to in this specification are herein incorporated in their entirety by reference into the specification, to the same extent as if each individual patent, patent application, or publication, was specifically and individually indicated to be incorporated herein by reference. In addition, citation or identification of any reference in this application shall not be construed as an admission that such reference is available as prior art to the present invention.

REFERENCES

1. U.S. Pat. No. 6,995,840, to Hagler, entitled: "Method And Apparatus For Radiation Encoding And Analysis".
2. U.S. Pat. No. 6,992,809, to Wang, et al., entitled: "Multi-conjugate Liquid Crystal Tunable Filter".
3 (a,b,c). U.S. Pat. Nos. 6,922,645 (a), 6,842,702 (b), and 6,687,620 (c), each to Haaland, et al., each entitled: "Augmented Classical Least Squares Multivariate Spectral Analysis".
4. U.S. Pat. No. 6,912,322, to Smith, et al., entitled: "Adaptive Process For Removing Streaks In Multi-band Digital Images".
5. U.S. Pat. No. 6,886,953, to Cook, entitled: "High-resolution, All-reflective Spectrometer".
6. U.S. Pat. No. 6,724,940, to Qian, et al., entitled: "System And Method For Encoding Multidimensional Data Using Hierarchical Self-organizing Cluster Vector Quantization".
7 (a,b). U.S. Pat. Nos. 6,711,503 (a), and 6,341,257 (b), each to Haaland, each entitled: "Hybrid Least Squares Multivariate Spectral Analysis Methods".
8. U.S. Pat. No. 6,701,021, to Qian, et al., entitled: "System And Method For Encoding/Decoding Multidimensional Data Using Successive Approximation Multi-stage Vector Quantization".
9. U.S. Pat. No. 6,546,146, to Hollinger, et al., entitled: "System For Interactive Visualization And Analysis Of Imaging Spectrometry Datasets Over A Wide-area Network".
10. U.S. Pat. No. 6,415,233, to Haaland, entitled: "Classical Least Squares Multivariate Spectral Analysis".
11. U.S. Pat. No. 6,018,587, to Cabib, entitled: "Method For Remote Sensing Analysis By Decorrelation Statistical Analysis And Hardware Therefor".
12. U.S. Pat. No. 5,782,770, to Mooradian, et al., entitled: "Hyperspectral Imaging Methods And Apparatus For Non-invasive Diagnosis Of Tissue For Cancer".
13. U.S. Pat. No. 5,724,135, to Bernhardt, entitled: "Hyperspectral Imaging Using Rotational Spectro-tomography".
14. *Fluorescence Imaging Spectroscopy and Microscopy*, edited by Wang, X. F., and Herman, B., Vol. 137 of *Chemical Analysis*, edited by Winefordner, J. D., published by John Wiley & Sons, Inc., New York (1996).
15. *Computer-Assisted Microscopy—The Measurement and Analysis of Images*, by Russ, J. C., published by Plenum Press, New York, Plenum Publishing Corp., New York, USA (1990).
16. *Fourier Transforms in Spectroscopy*, by Kauppinen, J., and Partanen, J., 1st edition, published by Wiley-VCH Verlag Berlin GmbH, Berlin, Germany (2001).
17. *Fundamentals of Fourier Transform Infrared Spectroscopy*, by Smith, B. C., published by CRC Press LLC, Florida, USA (1996).
18. Kettig, R. L. and Landgrebe, D., "Classification Of Multispectral Image Data By Extraction And Classification Of Homogeneous Objects", *IEEE Transactions on Geoscience Electronics*, Vol. GE14, 19 (1976).
19. Yu, P., Anastassopoulos, V., and Venetsanopoulos, A. N., "Pattern Classification And Recognition Based On Morphology And Neural Networks", *Can. J. Elect. and Comp. Eng.*, Vol. 17, No. 2, 58-59 (1992).
20. PCT Pat. Appl. No. IL03/00292, having International Publication No. WO 2003/085371, of same applicant/assignee as the present invention, entitled: "Real Time High Speed High Resolution Hyper-spectral Imaging".
21. U.S. Pat. No. 6,697,510, to Moshe, of same applicant/assignee as the present invention, entitled: "Method For Generating Intra-particle Crystallographic Parameter Maps And Histograms Of A Chemically Pure Crystalline Particulate Substance".
22. U.S. Pat. No. 6,694,048, to Moshe, of same applicant/assignee as the present invention, entitled: "Method For Generating Intra-particle Morphological Concentration/Density Maps And Histograms Of A Chemically Pure Particulate Substance".
23. U.S. Pat. No. 6,438,261, to Moshe, et al., of same applicant/assignee as the present invention, entitled: "Method Of In-situ Focus-fusion Multi-layer Spectral Imaging And Analysis".
24. U.S. Pat. No. 6,091,843, to Horesh, et al., of same applicant/assignee as the present invention, entitled: "Method Of Clibration And Real-time Analysis Of Particulates".
25. U.S. Pat. No. 5,880,830, to Schechter, of same applicant/assignee as the present invention, entitled: "Spectral Imaging Method For On-line Analysis Of Polycyclic Aromatic Hydrocarbons In Aerosols".

What is claimed is:

1. A method of processing and analyzing hyper-spectral image data and information of hyperspectral imaged scenes via dynamic database updating, the method comprising the steps of:
    (a) identifying objects of non-interest being background of, or within, the hyperspectral imaged scenes, and objects of potential interest being potential targets of, or within, the hyperspectral imaged scenes, or, being potential background of, or within, the hyperspectral imaged scenes, from a sub-set of the hyper-spectral image data and information, by processing and analyzing emission type spectral representations of objects within said data and information sub-set, wherein step (a) includes using a first reference object database of hyper-spectral image data, information, and parameters of imaged reference objects, and, a second reference object database of biological, chemical, or/and physical data, information, and parameters of said imaged reference objects;
    (b) determining: (1) absence or presence of objects of interest, (2) additional said objects of non-interest, and (3) non-classifiable objects of potential interest, from said identified objects of potential interest, by processing and analyzing said identified objects of potential interest, wherein said determining includes performing following sub-steps (i)-(iii):

(i) forming a special database of said objects of potential interest;

(ii) comparing and correlating data and information of said special database of said sub-step (i) to data and information of said first reference object database of said hyper-spectral image data, information, and parameters, and, to said second reference object database of biological, chemical, or/and physical data, information, and parameters; and (iii) forming a temporary first reference object database of hyper-spectral image data, information, and parameters, and, a temporary second reference object database of biological, chemical, or/and data, information and parameters, by using results of said sub-step (ii);

(c) forming an updated first reference object database and an updated second reference object database, by using results of steps (a) and (b);

(d) repeating steps (a) through (c) for next sub-set of the hyper-spectral image data and information, by using said updated first reference object database and said updated second reference object database; and (e) repeating step (d) for a number of said next sub-sets of the hyper-spectral image data and information.

2. The method of claim 1, wherein step (a), said first reference object database of hyper-spectral image data, information, and parameters, includes theoretically or/and empirically determined data, information, and parameters, of, relating to, or/and associated with, spectral properties, characteristics, and behavior, of said imaged reference objects listed or indexed in a dynamically updatable reference list or index of reference objects.

3. The method of claim 2, wherein exemplary types of theoretically or/and empirically determined data, information, and parameters, are: (i) pixel intensity, (ii) signal-to-noise (S/N) ratio, (iii) image sharpness, (iv) spectral distances, and, (v) spectral fingerprint or signature pattern types of identification and characterization of said imaged reference objects listed or indexed in said dynamically updatable reference list or index of reference objects.

4. The method of claim 2, wherein step (a), said second reference object database of biological, chemical, or/and physical data, information, and parameters, includes theoretically or/and empirically determined data, information, and parameters, of, relating to, or/and associated with, biological, chemical, or/and physical properties, characteristics, and behavior, of same said imaged reference objects listed or indexed in said dynamically updatable reference list or index of reference objects.

5. The method of claim 4, wherein exemplary types of theoretically or/and empirically determined data, information, and parameters, are: (i) biological, chemical, or/and physical, composition, of said imaged reference objects listed or indexed in said dynamically updatable reference list or index of reference objects and, (ii) object morphology such as object size, shape, form, or/and configuration, of said imaged reference objects listed or indexed in said dynamically updatable reference list or index of reference objects.

6. The method of claim 1, wherein step (a), automatic pattern recognition (APR) and classification types of hyper-spectral image data and information processing and analyzing are performed by applying one or more image analysis algorithms to said sub-set of hyper-spectral image data and information.

7. The method of claim 1, wherein step (b), said sub-steps (i)-(iii) are performed for checking and controlling accuracy, precision, reproducibility, and sensitivity of performing step (a) and results formed therefrom.

8. The method of claim 1, wherein step (b), said sub-steps (i)-(iii) are performed for minimizing possible occurrence of obtaining false positive or/and false negative results in step (a).

9. The method of claim 1, further including recording, reporting, or/and displaying, progress and results while each of steps (a)-(e) is performed, during real time or/and during non-real time.

10. The method of claim 9, wherein said progress and results are with respect to the hyperspectral imaged scenes including or containing distributions of different relative numbers of said objects of non-interest, said objects of interest, and said objects of potential interest.

11. The method of claim 9, wherein said progress and results are with respect to dynamic updating of said first reference object database of hyper-spectral image data, information, and parameters, and, dynamic updating of said second reference object database of biological, chemical, or/and physical data, information, and parameters.

\* \* \* \* \*